United States Patent
Héroux et al.

(10) Patent No.: US 10,656,352 B2
(45) Date of Patent: May 19, 2020

(54) OFF-AXIS MICRO-MIRROR ARRAYS FOR OPTICAL COUPLING IN POLYMER WAVEGUIDES

(71) Applicant: INTERNATIONAL BUSINESS MACHINES CORPORATION, Armonk, NY (US)

(72) Inventors: Jean Benoit Héroux, Tokyo (JP); Masao Tokunari, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/235,181

(22) Filed: Dec. 28, 2018

(65) Prior Publication Data

US 2019/0137704 A1 May 9, 2019

Related U.S. Application Data

(62) Division of application No. 15/364,790, filed on Nov. 30, 2016, now Pat. No. 10,168,494.

(51) Int. Cl.
*G02B 6/42* (2006.01)
*G02B 6/34* (2006.01)
*G02B 6/43* (2006.01)

(52) U.S. Cl.
CPC ............ *G02B 6/4214* (2013.01); *G02B 6/34* (2013.01); *G02B 6/425* (2013.01); *G02B 6/4239* (2013.01); *G02B 6/4255* (2013.01); *G02B 6/43* (2013.01)

(58) Field of Classification Search
None
See application file for complete search history.

(56) References Cited

U.S. PATENT DOCUMENTS

| | | | |
|---|---|---|---|
| 6,285,808 B1 | 9/2001 | Mehlhorn et al. | |
| 6,370,292 B1 | 4/2002 | Strake | |
| 6,987,906 B2 * | 1/2006 | Nakama | G02B 6/12004 385/15 |
| 7,263,256 B2 | 8/2007 | Kim et al. | |
| 7,796,851 B2 * | 9/2010 | Yonekura | G02B 6/43 385/129 |

(Continued)

FOREIGN PATENT DOCUMENTS

| | | | |
|---|---|---|---|
| JP | 2004118081 A | * | 4/2004 |
| JP | 2008262116 A | * | 10/2008 |

(Continued)

OTHER PUBLICATIONS

Beir et al. Machine Translation of Description of WO 2008/022609 A1., 2008. (Year: 2008).*

(Continued)

*Primary Examiner* — Michelle R Connelly
(74) *Attorney, Agent, or Firm* — Tutunjian & Bitetto, P.C.; Vazken Alexanian

(57) ABSTRACT

A micro-mirror array for optical coupling in a waveguide array including, a transparent body having a slanted portion, a sidewall portion, and a bottom portion, the sidewall portion and the bottom portion each respectively facing the slanted portion, and wherein a complementary shape of a conventional form off-axis mirror is arranged on the slanted portion, and a reflective coating on at least a portion of the complementary shape.

20 Claims, 14 Drawing Sheets

(56) References Cited

U.S. PATENT DOCUMENTS

| | | | |
|---|---|---|---|
| 8,358,892 B2 | 1/2013 | Oda et al. | |
| 8,542,963 B2 * | 9/2013 | Nakagawa | B29D 11/0075 385/14 |
| 9,086,551 B2 | 7/2015 | Heroux | |
| 9,151,888 B2 | 10/2015 | Mori et al. | |
| 9,179,584 B2 | 11/2015 | La Porta et al. | |
| 9,285,555 B2 | 3/2016 | Yabre | |
| 9,952,391 B2 | 4/2018 | Sakai et al. | |
| 2004/0096152 A1 * | 5/2004 | Nakama | G02B 6/12004 385/31 |
| 2004/0131302 A1 * | 7/2004 | Kouta | G01J 1/04 385/14 |
| 2005/0063637 A1 | 3/2005 | Mershon et al. | |
| 2005/0089276 A1 * | 4/2005 | Yoon | G02B 6/43 385/43 |
| 2006/0251360 A1 | 11/2006 | Lu et al. | |
| 2007/0183718 A1 * | 8/2007 | Bae | G02B 6/12004 385/47 |
| 2009/0245725 A1 | 10/2009 | Yonekura et al. | |
| 2010/0278485 A1 | 11/2010 | Nakagawa et al. | |
| 2012/0267338 A1 * | 10/2012 | Nakagawa | B29D 11/0075 216/24 |
| 2015/0293305 A1 | 10/2015 | Nakagawa et al. | |
| 2016/0238801 A1 * | 8/2016 | Lee | G02B 6/43 |
| 2016/0306110 A1 * | 10/2016 | Lambert | H05K 999/99 |
| 2016/0313519 A1 | 10/2016 | Yanagisawa | |
| 2017/0322382 A1 * | 11/2017 | Tateyama | G02B 6/264 |

FOREIGN PATENT DOCUMENTS

| | | | |
|---|---|---|---|
| JP | 2015197458 A | 11/2015 | |
| KR | 20040106674 A * | 12/2004 | G02B 6/122 |
| WO | WO-2008022609 A1 * | 2/2008 | G02B 6/32 |
| WO | 2015/176050 A1 | 11/2015 | |
| WO | WO-2016080296 A1 * | 5/2016 | G02B 6/264 |

OTHER PUBLICATIONS

V. Bardinal et al., "Collective Micro-Optics Technologies for VCSEL Photonic Integration," Hindawi Publishing Corporation. Advances in Optical Technologies, vol. 2011. Article ID 609643. Sep. 13, 2011, pp. 1-12.

Yi Lu et al., "Direct write of microlens array using digital projection photopolymerization," Applied Physics Letters 92, 3 041109. 2008 American Institute of Physics. Published online on Jan. 30, 2008. pp. 1-3.

Jose Mireles, Jr. et al., "Packaging investigation and study for optical interfacing of micro components with optical fibers—Part I," Superficies y Vacio 20(1). Sociedad Mexicana de Ciencia y Tecnologia de Superficies y Materiales. Mar. 2007. pp. 1-13.

Hirokatsu Yumoto et al., "Fabrication of elliptically figured mirror for focusing hard x rays to size less than 50 nm," AIP Publishing. Review of Scientific Instruments 76, 063708. 2005 American Institute of Physics. Published online on Jun. 7, 2005. http://dx.doi.org/10.1063/1.1922827. pp. 1-5.

Office Action dated Jun. 27, 2019 for U.S. Appl. No. 16/235,024.

* cited by examiner

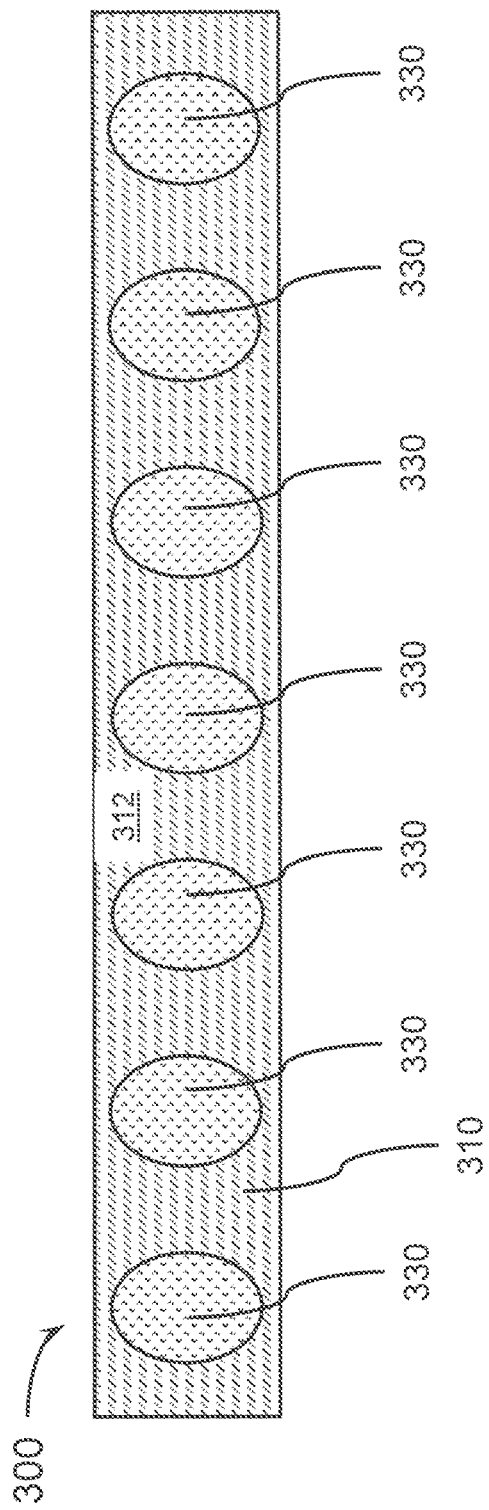
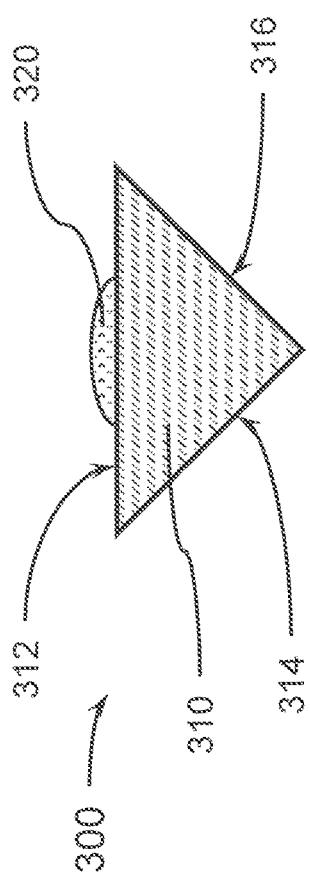
FIG. 5
FIG. 6

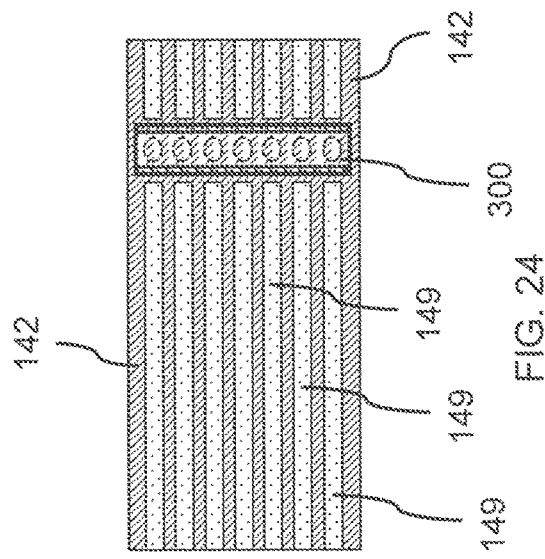
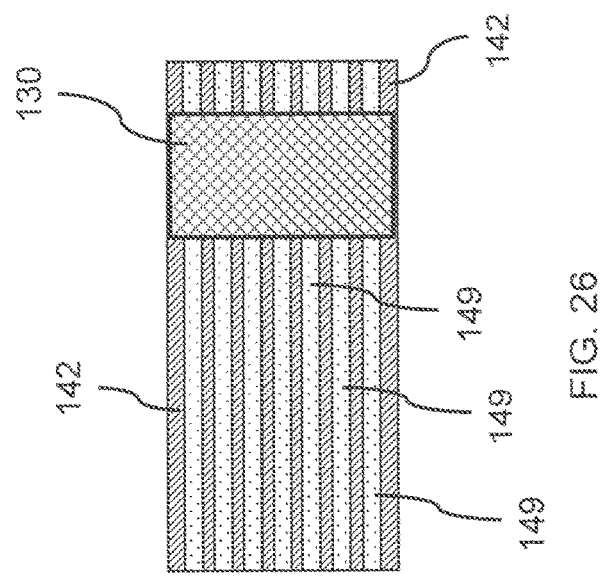
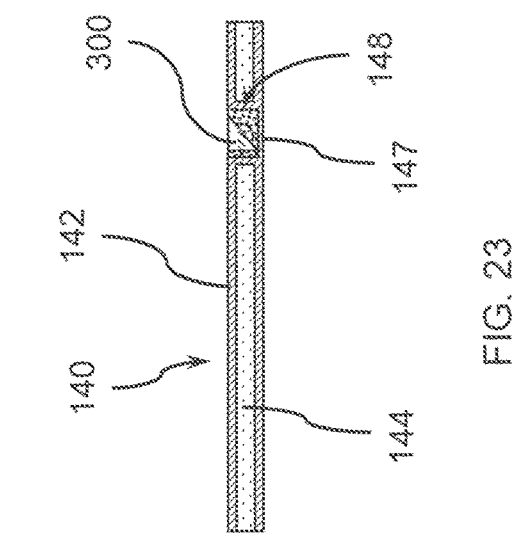
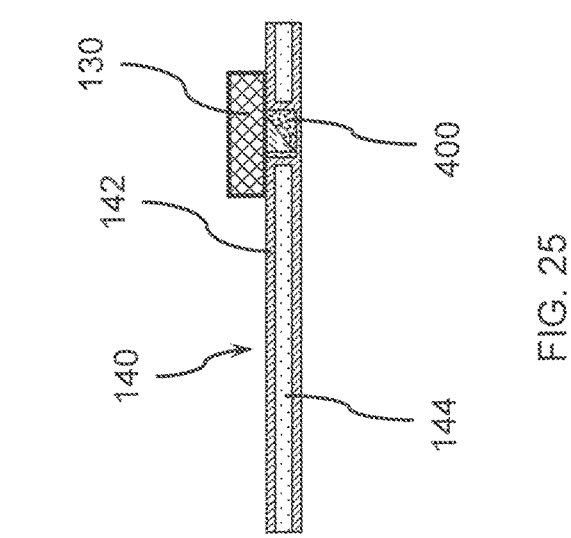

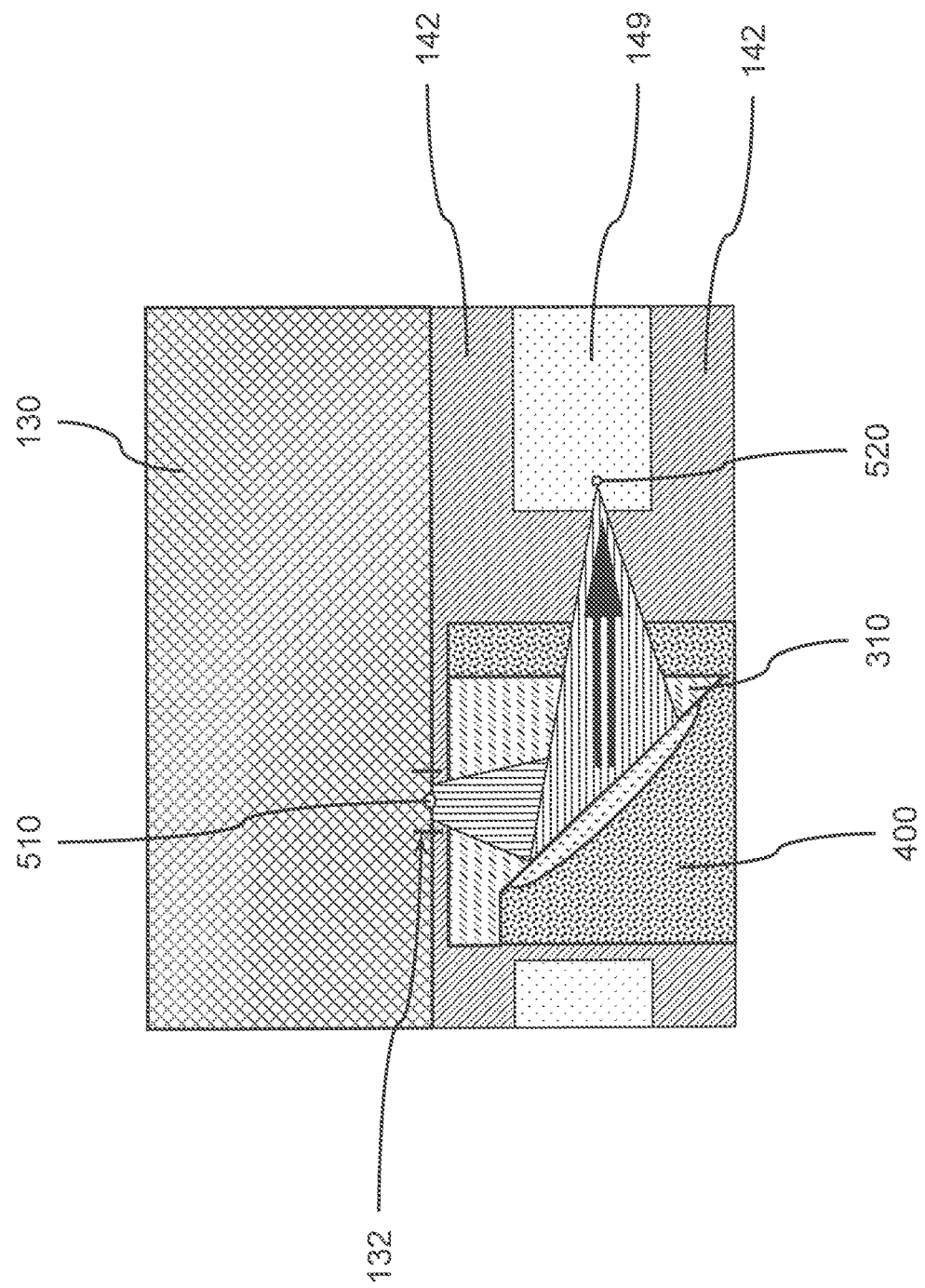

OFF-AXIS MICRO-MIRROR ARRAYS FOR OPTICAL COUPLING IN POLYMER WAVEGUIDES

BACKGROUND

Technical Field

The present invention generally relates to a micro-mirror array in a waveguide array, and, more particularly, to a micro-mirror array in a polymer waveguide array to optically couple opto-electronic devices and fiber connectors to the polymer waveguide array.

Description of the Related Art

As digital technology advances, the need for higher rates of data transfer in high performance computers and data centers increases. Such data transfers occur either within a system (at an approximate range of roughly 100 or fewer meters) or between buildings at close proximity (at an approximate range of 1 kilometer (km)).

To satisfy this need, technological solutions need to be at a reasonable price range and allow for high channel density in a compact form.

Recently, optical multi-chip modules that include an organic laminated build-up substrate and polymer waveguide layers have been developed. In such modules, opto-electronic chip arrays (such as Vertical-Cavity Surface-Emitting Lasers (VCSELs) and photodiodes) are mounted by flip-chip bonding near CPU chips, and micro-lenses used for light coupling into and out of waveguide cores.

However, present approaches result in optical losses of several dBs. As the data rate increases to 25 Gbps and beyond, and waveguide core size decreases, this problem becomes even more acute.

SUMMARY

In accordance with an embodiment of the present invention, a micro-mirror array for optical coupling in a waveguide array is provided. The micro-mirror array includes a transparent body having a slanted portion, a sidewall portion, and a bottom portion, the sidewall portion and the bottom portion each respectively facing the slanted portion, and wherein a complementary shape of a conventional form off-axis mirror is arranged on the slanted portion. The micro-mirror array further includes a reflective coating on at least a portion of the complementary shape.

In accordance with another embodiment of the present invention, a multi-chip module is provided. The multi-chip module includes a waveguide array, an opening in the waveguide array, and a micro-mirror array inserted in the opening in the waveguide array, where the micro-mirror array has a prism shape with three elongated surfaces and two end surfaces, and one or more ellipsoidal or paraboloidal protrusion(s) on one of the elongated surfaces.

In accordance with yet another embodiment of the present invention, a method of forming a multi-chip module is provided. The method includes filling a mold with a transparent material to form a micro-mirror array having a prism shape with three elongated surfaces and two end surfaces, and one or more ellipsoidal or paraboloidal protrusion(s) formed on one of the three elongated surfaces. The method further includes forming a reflective coating on at least one of the one or more ellipsoidal or paraboloidal protrusion(s). The method further includes inserting the elongated transparent body into an opening in a waveguide array, such that one of the elongated surfaces without the ellipsoidal or paraboloidal protrusion(s) faces one or more waveguide core ends, and the other elongated surface without the ellipsoidal or paraboloidal protrusion(s) faces an opto-electronic chip array or fiber optic connector.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 is a top view showing a micro-mirror array, in accordance with an embodiment of the present invention;

FIG. 6 is a side view showing a micro-mirror array, in accordance with an embodiment of the present invention;

FIG. 23 is a cross-sectional side view showing a micro-mirror array inserted into the opening from the top, in accordance with an embodiment of the present invention;

FIG. 24 is a top view showing the flat elongated surface of the micro-mirror array in the opening formed in a waveguide array, in accordance with an embodiment of the present invention;

FIG. 25 is a cross-sectional side view of waveguide array showing a laser diode array affixed to the top surface of the waveguide array on the micro-mirror array, in accordance with an embodiment of the present invention;

FIG. 26 is a top view showing the positioning of the laser diode array over the exposed surface of the micro-mirror array, in accordance with an embodiment of the present invention;

FIG. 27 is a side view of a laser diode array aligned with a micro-mirror array, such that a light beam from a laser diode is focused through an aperture into a waveguide core, in accordance with an embodiment of the present invention;

DETAILED DESCRIPTION

Figure 1:
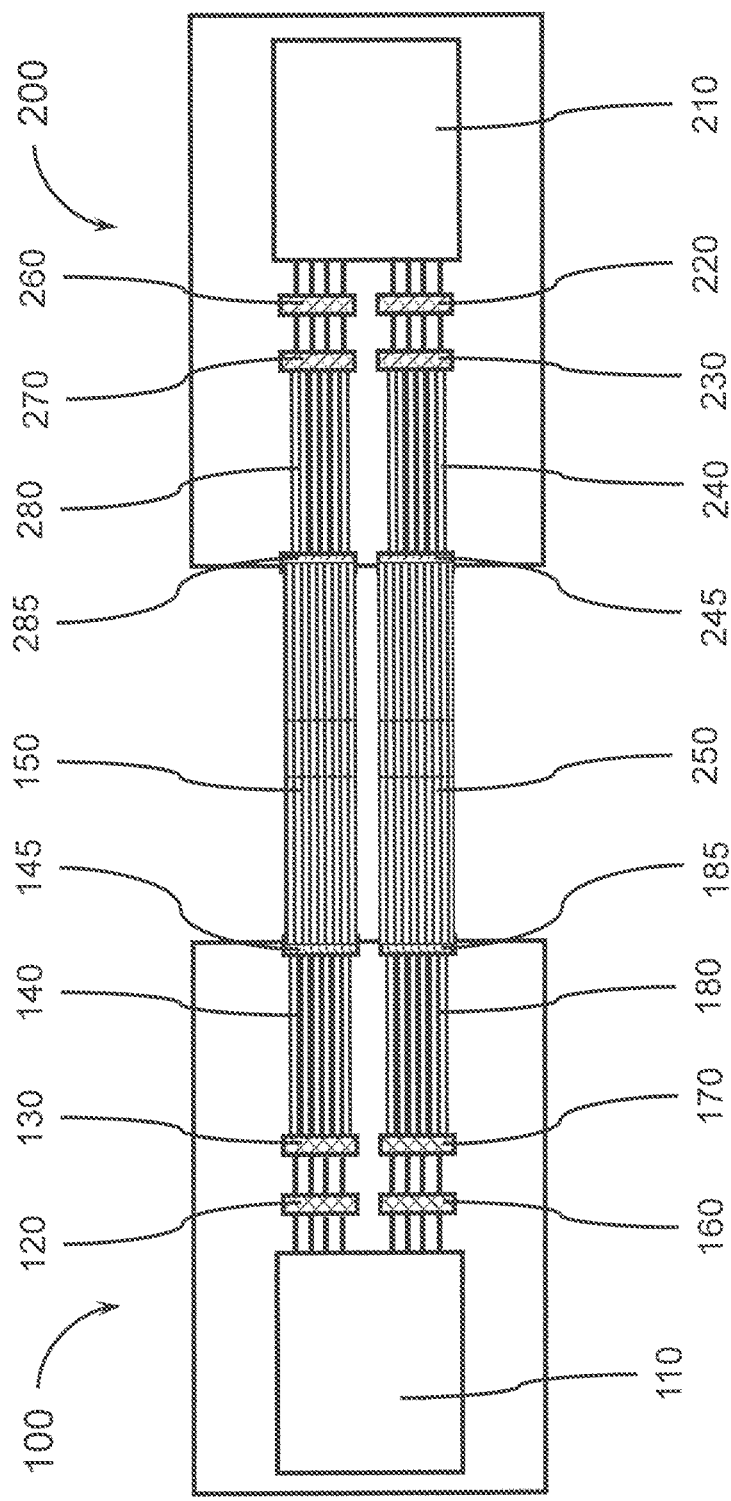
FIG. 1 is a top view showing two multi-chip modules having laser diodes and photodiodes coupled to optical fibers by a waveguide, in accordance with embodiments of the present invention.

Principles and embodiments of the present invention relates generally to reducing optical losses incurred by coupling light signals through different transmission mediums in which the light signal propagates across multiple interfaces with different indexes of refraction and undergoes beam broadening that exacerbates light leakage at the interfaces and coupling junctions.

Principles and embodiments of the present invention also relate to an approach that reduces the current optical loss of several dBs by more efficiently coupling light beams to waveguides and photo-devices, particularly where an important cause of this loss is that the far-field profile of light emitted by a VCSEL at the output of a waveguide is too large, so that optical coupling is not efficient. Similarly, the far field profile at the end of a waveguide can be too large, so that optical coupling to a photodiode or fiber connector is not efficient.

Principles and embodiments of the present invention relates to coupling light generated by a coherent light source (e.g., laser diode) into a waveguide using off-axis mirrors (e.g., mirror array) instead of micro-lenses to reduce or eliminate surface and total internal reflections, air interfaces, chromatic aberrations, dispersion, and other loss mechanisms incurred using a micro-lens. In various embodiments, the coherent light source can be a vertical-cavity surface-emitting laser (VCSEL), where the emitted light projects perpendicularly from a top or bottom surface of the laser diode instead of from an edge. The off-axis mirror may replace a flat micro-mirror to decrease optical loss or a flat micro-mirror and micro-lens assembly to decrease optical loss and avoid having to build a complex vertical stack with holes for optical access.

The present principles relate to optical coupling in a polymer waveguide. An important cause of optical signal loss for high-data rate optical transmissions/communication is that the far-field profile of light emitted by a VCSEL and at the output of a waveguide core is too large, so that optical coupling is not efficient. A micro-mirror array inserted into a polymer waveguide array can optically couple a Vertical-Cavity Surface-Emitting Lasers (VCSELs) or photodiode array to the fiber optic cores of a polymer waveguide array.

Principles and embodiments of the present invention relate to off-axis mirrors and the fabrication and use of off-axis ellipsoidal and paraboloidal micro-mirror arrays (tens to hundreds of microns scale) to modify the properties of a light beam. The micro-mirrors can have four different configurations:

1) an ellipsoid shape to convert output from a light source such as VCSEL to the acceptance angle and spatial profile of a waveguide core;

2) an ellipsoid shape to focus the output beam of a waveguide onto a surface with a very small spot size at a small distance from the core, for example, an opto-electronic device;

3) a paraboloid shape to make the output beam of a waveguide parallel, for example, for a lens connector coupling to an optical fiber; and 4) a paraboloid shape to focus a parallel beam coming from a fiber with a lens connector onto a waveguide core, with acceptance angle and spatial profile matching.

In one or more embodiments, the systems include off-axis micro-mirrors that include a transparent body having a slanted portion, a sidewall portion, and a bottom portion, the sidewall portion and the bottom portion each respectively facing the slanted portion, and wherein a complementary shape of a conventional form off-axis mirror is arranged on the slanted portion. The off-axis micro-mirrors also include a reflector on the complementary shape, wherein the transparent body is placed into an opening for optical coupling formed in the polymer waveguide so that the sidewall portion can face a waveguide core end portion, and wherein light enters through the transparent body from the bottom portion and travels to the sidewall portion by reflecting at the reflector, and vice versa. The slanted portion of the cross-section of the micro-mirror transparent body can be the hypotenuse of a right triangle, a sidewall portion can be a first leg of the right triangle, and the bottom portion can be the other leg of the right triangle. The sidewall portion, and a bottom portion can form the right (i.e., 90°) angle, where the slanted portion is the hypotenuse of the right triangle.

Off-axis mirror arrays, in accordance with the present principles, can be produced using commercially available fabrication techniques, such as, e.g., those for commercially available off-axis mirrors at a cm-size scale, commercially available micro-lens arrays to collimate or focus light into a fiber typically having a graded index and a 50 um core size, etc. Regarding the off-axis mirrors, these mirrors, unlike thick lenses, do not suffer from aberration or chromatic dispersions for a parallel beam or point source.

Principles and embodiments of the present invention also relate to providing optical multi-chip modules that are easier to manually connect optical fiber arrays to waveguide arrays by changing the direction by about 90° from an edge connection to a top face connection. Fiber optic connector(s) can be placed on the surface of a multi-chip module without being limited by edge size or edge accessibility by using micro-mirrors.

Principles and embodiments of the present invention also relate to eliminating a component by combining a mirror and a lens into a single curved mirror (e.g., a paraboloidal mirror) with advantageous properties, e.g., do not suffer from aberration or chromatic dispersions for a parallel beam or point source.

In various embodiments, a micro-mirror array can focus light beams onto the micro-lenses, for example, of a fiber optic connector to optically couple a plurality of optical signals into and/or out of an optical fiber array.

Exemplary applications/uses to which the present invention can be applied include, but are not limited to: optical transmitters, receivers, and transceivers that provide optical communication within and between computer systems or similar devices, where the communication can be directly between microelectronic chips (e.g., directly through a waveguide array) or through two or more waveguide arrays and optical fibers to remote systems. Transmitted signals/channels can separate and go to different devices, and/or received signals/channels can come from different devices.

Referring now to the drawings in which like numerals represent the same or similar elements and initially to FIG. 1, a top view of two multi-chip modules having laser diodes and photodiodes coupled to optical fibers by a waveguide is shown, in accordance with embodiments of the present invention.

In one or more embodiments, a first multi-chip module 100 may be a waveguide-integrated organic carrier (i.e., optoelectronic packaging structure that is assembled directly onto an organic card with parallel waveguides) that includes a first central processing unit (CPU) 110, a first laser diode (LD) array 130, a first laser diode driver (LDD) 120 electrically connected to the first laser diode array 130 and first CPU 110, a first waveguide array 140 having a plurality of channels, and a first fiber optic connector 145 optically coupled to the first waveguide array 140. The fiber optic connectors 145, 185, 245, 285 can be removable fiber optic connectors affixed to a top surface of the waveguide array 140, 180, 240, 280, where the fiber optic connectors can include micro-lenses for optically coupling a light signal to an optical fiber array 150, 250.

In various embodiments, the laser diode array 130 may be a VCSEL opto-electronic chip array, where the laser diode array 130 may have, for example, 12 or 24 channels, and where the laser diode array may be mounted by flip-chip bonding onto the first waveguide array 140 near the CPU chip 110. In various embodiments, the laser diode driver (LDD) 120 may be mounted to the first waveguide array 140, between the first CPU 110 and the first laser diode array 130. The term opto-electronic chip arrays refers to both laser diodes (e.g., Vertical-Cavity Surface-Emitting Lasers (VCSELs)) and photodiodes. Micro-lenses may focus light beams from the laser diode array 130.

In one or more embodiments, the first multi-chip module 100 may further include a second fiber optic connector 185, a second waveguide array 180 having a plurality of channels optically coupled to the second fiber optic connector 185, a first photodiode (PD) array 170 optically coupled to the second waveguide array 180, and a first trans-impedance amplifier (TIA) 160 electrically connected to the first photodiode (PD) array 170 and the first CPU 110. The first PD array 170 may be mounted, by flip-chip bonding, onto the second waveguide array 180 adjacent to the trans-impedance amplifier 160 and near the CPU 110. The trans-impedance amplifier (TIA) 160 may be mounted to the second waveguide array 180, between the first CPU 110 and the first PD array 140. Micro-lenses may focus light beams on to the PD array 170.

In one or more embodiments, a second multi-chip module 200 may be a waveguide-integrated organic carrier (i.e., optoelectronic packaging structure that is assembled directly onto an organic card with parallel waveguides) that includes a second central processing unit (CPU) 210, a second laser diode (LD) array 230, a second laser diode driver (LDD) 220 electrically connected to the second laser diode array 230 and second CPU 210, a third waveguide array 240 having a plurality of channels, and a third fiber optic connector 245 optically connected to the third waveguide array 240. In various embodiments, the second laser diode array 230 may be a VCSEL opto-electronic chip array, where the second laser diode array 230 may have, for example, 12 or 24 channels, and where the second laser diode array 230 may be mounted by flip-chip bonding onto the third waveguide array 240 near the second CPU 210. In various embodiments, the second laser diode driver (LDD) 220 may be mounted to the third waveguide array 240, between the second CPU 210 and the second laser diode array 230.

In one or more embodiments, the second multi-chip module 200 may further include a fourth fiber optic connector 285, a fourth waveguide array 280 having a plurality of channels optically coupled to the fourth fiber optic connector 285, a second photodiode (PD) array 270 optically coupled to the fourth waveguide array 280, and a second trans-impedance amplifier (TIA) 260 electrically connected to the second photodiode (PD) array 270 and the second CPU 210. The second PD array 270 may be mounted, by flip-chip bonding, onto the fourth waveguide array 280 adjacent to the second trans-impedance amplifier 260 and near the second CPU 210. The trans-impedance amplifier (TIA) 260 may be mounted to the fourth waveguide array 280, between the second CPU 210 and the second PD array 240.

In one or more embodiments, the first waveguide array 140 and first fiber optic connector 145 can be optically coupled to the fourth fiber optic connector 285 and fourth waveguide array 280 by a first optical fiber array 150, where the first optical fiber array 150 can include one or more optical fiber cores. In various embodiments, the first optical fiber array 150 can be a fiber optic ribbon that has a separate optical fiber core for each channel of the first laser diode array 130, for example, 12 or 24 channels.

In one or more embodiments, the third waveguide array 240 and third fiber optic connector 245 can be optically coupled to the second fiber optic connector 185 and second waveguide array 180 by a second optical fiber array 250, where the second optical fiber array 250 can include one or more optical fiber cores. In various embodiments, the second optical fiber array 250 can be a fiber optic ribbon that has a separate optical fiber core for each channel of the second laser diode array 230, for example, 12 or 24 channels.

In one or more embodiments, a first waveguide array 140 (e.g., having 12 or 14 channels), and a second waveguide array 180 (e.g., having 12 or 14 channels) can be polymer waveguide arrays, where the waveguide array(s) include a plurality of polymer layers that form a wave-guide core and a waveguide cladding. The polymer layers can have a pattern that forms waveguide cores and a waveguide cladding. A plurality of waveguide cores can provide a plurality of light channels, each carrying a different signal. Each of the waveguide cores can be surrounded by cladding material.

In various embodiments, a first VCSEL opto-electronic chip array 130 (e.g., having 12 or 24 channels) may be mounted, by flip-chip bonding, onto the first polymer waveguide array 140, and a first PD chip array 170 may be mounted, by flip-chip bonding, onto a second polymer waveguide array 180. A first laser diode driver (LDD) 120 may also be mounted onto the first polymer waveguide array 140, between the first CPU 110 and the VCSEL opto-electronic chip array 130, and a first trans-impedance amplifier (TIA) 160 may be mounted, by flip-chip bonding, onto a second polymer waveguide array 180 between the first CPU 110 and the first PD chip array 170.

In one or more embodiments, the two multi-chip modules 100, 200 can use an optical fiber array 150, 250 as a waveguide interconnect for coupling of data transmission through the optical fibers from the first multi-chip module, where the waveguide can be a polymer waveguide-based optical interconnect 100 to the second multi-chip module 200, and from the second multi-chip module 200 to the first multi-chip module 100, where the two multi-chip modules 100, 200 can be transceivers.

One or more embodiments relate to a device that can transmit and receive light signals, for example, within a computer system, where signals from one device may to go a single other similar device, with or without an optical fiber array 150, 250. The transmitted channels may separate and go to two or more different devices, while received channels may come from two or more different devices.

In various embodiments, the first CPU 110, first laser diode driver (LDD) 120, and first laser diode array 130 can be a transmitter, and the second PD array 270, second trans-impedance amplifier (TIA) 260, and second CPU 210 can be a receiver of optical signals transmitted from the first laser diode array 130 of the first multi-chip module 100. Similarly, the second CPU 210, second laser diode driver 220, and second laser diode array 230, can be a transmitter, and the first PD array 170, first trans-impedance amplifier (TIA) 160, and first CPU 210 can be a receiver of optical signals transmitted from the second laser diode array 230 of the second multi-chip module 200.

In one or more embodiments, the first waveguide array 140 on multi-chip module 100 can be connected and/or optically coupled to the fourth waveguide array 280 on multi-chip module 200 by one or more fiber optic array(s) 150 by a first waveguide connector 145 and a fourth waveguide connector 285, where the first waveguide connector 145 and a fourth waveguide connector 285 may include micro-lens arrays for focusing the light signals into the optical fibers of the fiber optic array(s) 150. The light signal can be a parallel light beam that is focused onto a micro-lens of the waveguide connector into an optical fiber of the fiber optic array(s) 150.

In one or more embodiments, the second waveguide array 180 on multi-chip module 100 can be connected and/or optically coupled to the third waveguide array 240 on multi-chip module 200 by one or more fiber optic array(s) 250 by a second waveguide connector 185 and a third waveguide connector 245, where the second waveguide connector 185 and the third waveguide connector 245 may include micro-lens arrays for focusing the light signals into the optical fibers of the fiber optic array(s) 250. The light signal can be a parallel light beam that is focused onto a micro-lens of the waveguide connector into an optical fiber of the fiber optic array(s) 250. The connectors 145, 185, 245, 285 including micro-lens arrays, can be used to couple light to one of the one or more fiber optic array(s) 150, 250, when data is transmitted and received from the multi-chip modules 100, 200.

Figure 2:
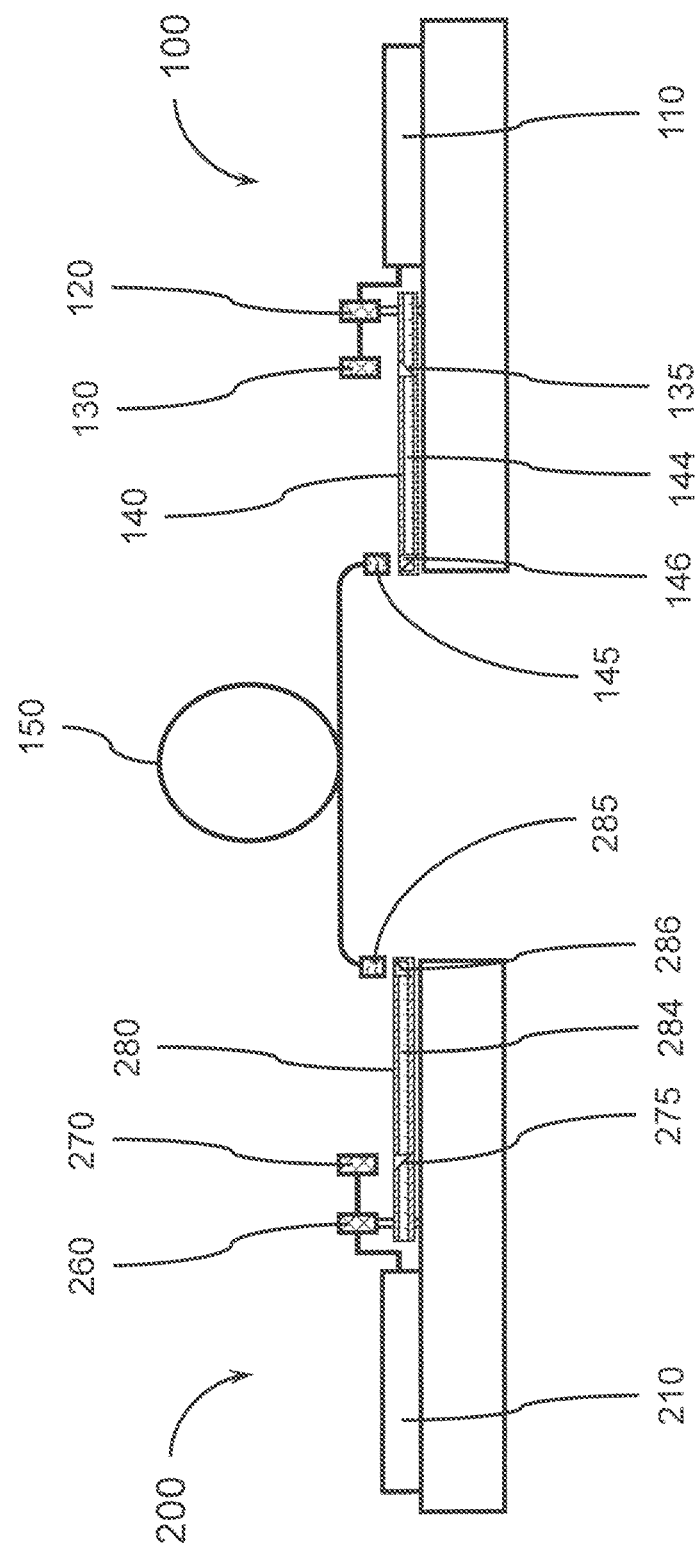
FIG. 2 is a left side view showing two multi-chip modules connected by a fiber optic array, in accordance with the present principles.

FIG. 2 is a left side view showing two multi-chip modules connected by a fiber optic array, in accordance with the present principles.

In one or more embodiments, one or more micro-mirror arrays 135, 175 may be located in the first and second waveguide arrays 140, 180 in multi-chip module 100, and one or more micro-mirror arrays 235, 275 may be located in the third and fourth waveguide arrays 240, 280 in multi-chip module 200.

A micro-mirror array 286 may be positioned in the waveguide array 280, such that a light beam is reflected with an angle of approximately 90° and focused on the waveguide connector 285. A micro-mirror array 146 may be positioned in the waveguide array 140, such that a light beam is reflected with an angle of approximately 90° and focused on the waveguide connector 145.

In various embodiments, a paraboloidal micro-mirror array 286 may be positioned in the waveguide array 280, such that a light beam made parallel by the lens inside the waveguide connector 285 is reflected with an angle of approximately 90° and focused onto the waveguide core. A paraboloidal micro-mirror array 146 may be positioned in the waveguide array 140, such that a light beam is reflected with an angle of approximately 90° made parallel to be focused on the fiber end by the lens located inside the waveguide connector 145.

In one or more embodiments, micro-mirror arrays 135, 175 may be located in the first and second waveguide arrays 140, 180 in a light path between the laser diode array 130 (e.g., VCSEL opto-electronic chip array) and the waveguide connector 145, and between the PD array 170 and the waveguide connector 185. In various embodiments, the position of the micro-mirror array 135 in the waveguide array 140, can be, for example, such that a light beam from the first laser diode array 130 is reflected with an angle of approximately 90° and focused to enter the waveguide core 149 in a waveguide core layer 144 of a first waveguide array 140. The position of the micromirror array 275 in the waveguide array 280 can be, for example, such that the light beam at an aperture end face of a waveguide core 289 in a waveguide core layer 284 of the waveguide 280 is reflected with an angle of approximately 90° and focused on the photodiode array 270.

In various embodiments, each waveguide core 149, 289 in a waveguide core layer 144, 284 can have a side dimension in the range of about 20 microns (um) to about 100 microns, or in the range of about 20 um to about 50 um, or in the range of about 20 um to about 40 um, where the cross-section of the waveguide core has approximately a square shape. In various embodiments, photodiodes with a detector aperture diameter in the range of about 20 um to about 50 um, or in the range of about 20 um to about 40 um, or less, can increase signal bandwidth.

In one or more embodiments, electrical connections may be formed by metal lines on the carrier between the CPUs 110, 210 to the LDDs 120, 220, and TIAs 160, 260. The LDDs can be electrically connected to the LD arrays 130, 230, and the TIAs 160, 260 can be electrically connected to the PD arrays 170, 270.

Figure 3:
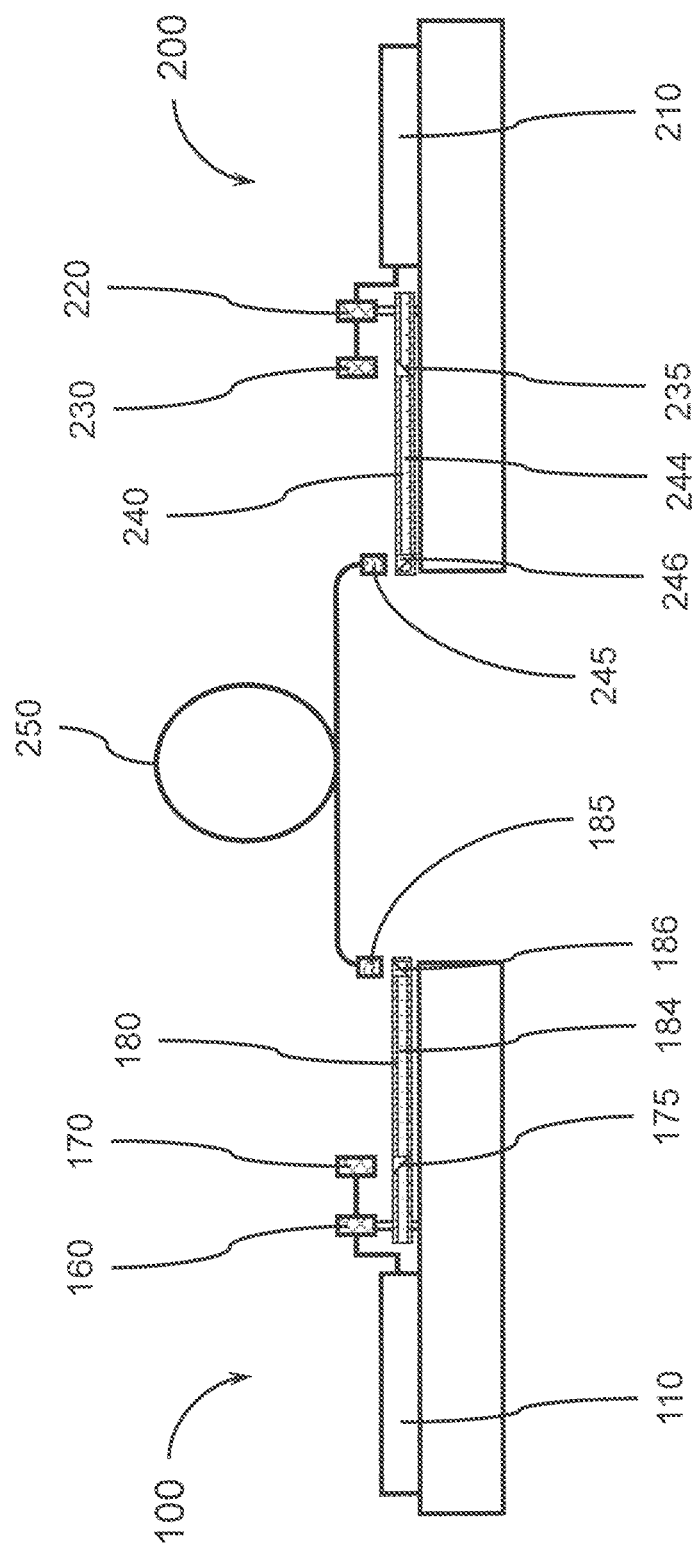
FIG. 3 is a right side view showing two multi-chip modules connected by a fiber optic array, in accordance with the present principles.

FIG. 3 is a right side view showing two multi-chip modules connected by a fiber optic array, in accordance with the present principles.

In one or more embodiments, micro-mirrors 235 may be located in the third waveguide array 240 in multi-chip module 200, in a light path between the laser diode array 230 (e.g., VCSEL opto-electronic chip array) and the waveguide connector 245.

In one or more embodiments, micro-mirrors 175 may be located in the second waveguide array 180 in multi-chip module 100, in a light path between the PD chip array 170 and the waveguide connector 185.

In one or more embodiments, micro-mirror array 235, 275 may be located in the third and fourth waveguide arrays 240, 280 in a light path between the VCSEL optoelectronic chip array 230 and the waveguide connector 245, and between the PD array 270 and the waveguide connector 285. In various embodiments, the position of the micro-mirror array 235 in the waveguide array 240, can be, for example, such that a light beam from the first laser diode array 230 is reflected with an angle of approximately 90° and focused to enter the waveguide core 249 in a waveguide core layer 244 of a first waveguide array 240. The position of the micro-mirror array 175 in the waveguide array 180 can be, for example, such that the light beam at an aperture end of a waveguide core 189 in a waveguide core layer 184 of the waveguide 180 is reflected with an angle of approximately 90° and focused on the photodiode array 170.

A micro-mirror array 186 may be positioned in the waveguide array 180, such that a light beam is reflected with an angle of approximately 90° and focused on the waveguide connector 185. A micro-mirror array 246 may be positioned in the waveguide array 240, such that a light beam is reflected with an angle of approximately 90° and focused on the waveguide connector 245.

In various embodiments, a paraboloidal micro-mirror array 186 may be positioned in the waveguide array 180, such that a light beam made parallel by the lens inside the waveguide connector 185 is reflected with an angle of approximately 90° and focused on the waveguide core end. A paraboloidal micro-mirror array 246 may be positioned in the waveguide array 240, such that a light beam is reflected with an angle of approximately 90° and made parallel to be focused by the lens inside the waveguide connector 245.

In various embodiments, the position of the micro-mirror arrays 135, 175, 235, 275 in the waveguide arrays 140, 180, 240, 280 can be, for example, at the theoretical (e.g., based on ray tracing) and/or actual (e.g., based on light focusing) intersection of a light beam.

In various embodiments, each waveguide core 149, 289 in a waveguide core layer 144, 284 can have a side dimension in the range of about 20 microns (um) to about 100 microns, or in the range of about 20 um to about 50 um, or in the range of about 20 um to about 40 um, where the cross-section of the waveguide core has approximately a square shape. In various embodiments, photodiode arrays 170, 270 with a detector aperture diameter in the range of about 20 um to about 50 um, or in the range of about 20 um to about 40 um, or less, can increase signal bandwidth.

In one or more embodiments, the micro-mirror arrays 135, 175 may be located in the first and second waveguide arrays 140, 180 in multi-chip module 100. In various embodiments, micro-mirror arrays 135, 175 may be located in the first and second waveguide arrays 140, 180 in a light path between the laser diode array 130 (e.g., VCSEL opto-electronic chip array) and the waveguide connector 145, and between the PD array 170 and the waveguide connector 185.

In one or more embodiments, micro-mirror arrays 235, 275 may be located in the third and fourth waveguide array 240, 280 in multi-chip module 200. In one or more embodiments, micro-mirrors 235, 275 may be located in the third and fourth waveguide arrays 240, 280 in a light path between the VCSEL opto-electronic chip array 230 and the waveguide connector 245, and between the PD array 270 and the waveguide connector 285. In various embodiments, the position of the micro-mirror arrays 135, 175, 235, 275 in the waveguide arrays 140, 180, 240, 280 can be, for example, at the theoretical (e.g., based on ray tracing) and/or actual (e.g., based on light focusing) intersection of a light beam.

Figure 4:
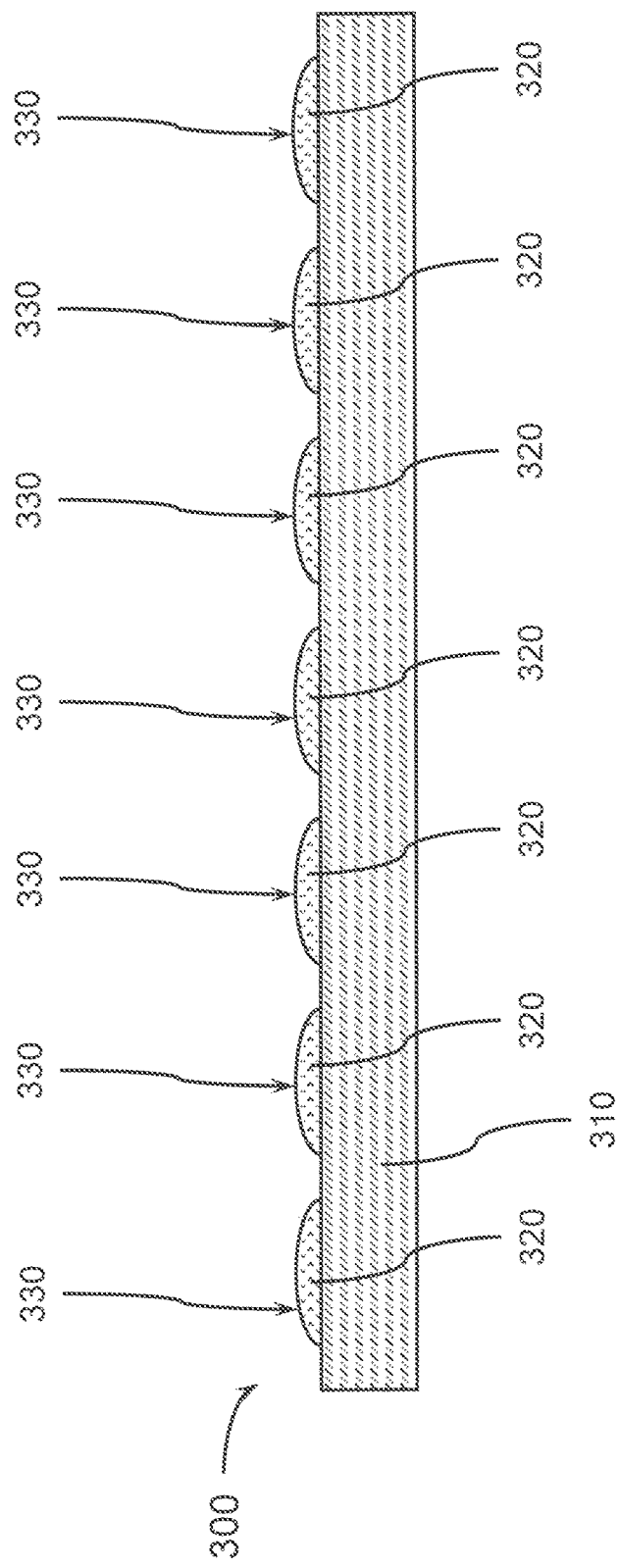
FIG. 4 is a front view showing a micro-mirror array, in accordance with an embodiment of the present invention.

FIG. 4 is a front view showing a micro-mirror array, in accordance with an embodiment of the present invention.

In one or more embodiments, a micro-mirror array 300 can be an off-axis micro-mirror array including one or more off-axis mirrors, where an off-axis mirror directs and focuses incident collimated light at a specific angle. By directing and focusing an incident light beam at a predetermined angle, unrestricted access to the focal point can be provided. A micro-mirror array 300 can include a micro-mirror array body 310 and one or more micro-mirrors formed by one or more ellipsoidal or paraboloidal protrusion(s) 320 and a reflective coating 330 on each of the one or more ellipsoidal or paraboloidal protrusion(s) 320. The ellipsoidal or paraboloidal protrusion(s) 320 can extend from a face of the micro-mirror array body 310, where the ellipsoidal or paraboloidal protrusion(s) 320 form the complementary shape of an ellipsoidal or paraboloidal mirror.

In one or more embodiments, the ellipsoidal or paraboloidal protrusion(s) 320 may be convex surfaces on which the reflective coating 330 is formed to create the complementary concave reflective surface at the interface with the ellipsoidal or paraboloidal protrusion(s) 320 of the micro-mirror array body 310. An off-axis ellipsoidal or paraboloidal mirror is thereby formed at the interface of the one or more ellipsoidal or paraboloidal protrusion(s) 320 and the reflective coating 330. The off-axis micro-mirror array can be configured and dimensioned to receive a light beam from a predetermined direction and reflect the light beam in a different direction, where the light beam may enter a first face of the micro-mirror array body 310 and exit a different face of the micro-mirror array body 310.

In one or more embodiments, a micro-mirror array 300, including the micro-mirror array body 310 and ellipsoidal or paraboloidal protrusion(s) 320 can be composed of a transparent material, for example, a transparent resin (e.g., polycarbonate, epoxy resin, etc.), where the micro-mirror array body 310 and ellipsoidal protrusion(s) 320 can form an optical substrate. In various embodiments, the one or more ellipsoidal protrusion(s) 320 can be configured and dimensioned to provide reflection and/or focusing at a predetermined angle.

FIG. 5 is a top view showing a micro-mirror array, in accordance with an embodiment of the present invention.

In one or more embodiments, a reflective coating 330 can be formed on each of the one or more ellipsoidal protrusion(s) 320. In various embodiments, the reflective coating 330 can be a metal, including but not limited to, gold, silver, aluminum, etc., where the reflective coating may be selected based on the wavelength of light expected to be incident on and reflected by the micro-mirror(s). The reflective coating 330 may provide an outwardly facing reflective surface and an inwardly facing reflective surface on the ellipsoidal protrusion(s) 320.

FIG. 6 is a side view showing a micro-mirror array, in accordance with an embodiment of the present invention.

In one or more embodiments, at least a portion of the micro-mirror array body 310 can have a triangular cross-section, where the micro-mirror array body 310 can have a prism shape with three elongated surfaces 312, 314, 316 and two end surfaces. The portion of the micro-mirror array body 310 having a triangular cross-section can be the portion on which the one or more ellipsoidal protrusion(s) 320 are located, where the one or more ellipsoidal protrusion(s) 320 can be located on the same elongated surface 312. In various embodiments, the shape of the triangular cross-section can be a right triangle (i.e., 90°), and the sides of the triangular cross-section (i.e., elongated surfaces 312, 314, 316) can have a length in the range of about 50 um to about 250 um, or in the range of about 50 um to about 200 um, or in the range of about 50 um to about 100 um, although other sizes are contemplated. In various embodiments, the micro-mirror array body 310 can have a length sufficient to have a number of micro-mirrors equal to the number of channels of the waveguide arrays. One of the elongated surfaces 314 of the triangular prism may be referred to as a sidewall portion, and another elongated surface 316 of the triangular prism can be a bottom portion, where each respectively faces the hypotenuse, which forms a slanted portion of the right, triangular prism. The ellipsoidal protrusion(s) 320 can be formed on the elongated surface 312 forming the hypotenuse of the triangular cross-section.

One or more micro-mirror arrays 135, 175, 235, 275 can be fabricated by molding or by 3D printing techniques, where the micro-mirror arrays can have a tolerance, i.e., a maximum variation in the overall size of a single micro-mirror, in the range of about 1 um, and a surface flatness of the ellipsoid or hyperboloid region in the sub-micron range.

Figure 7:
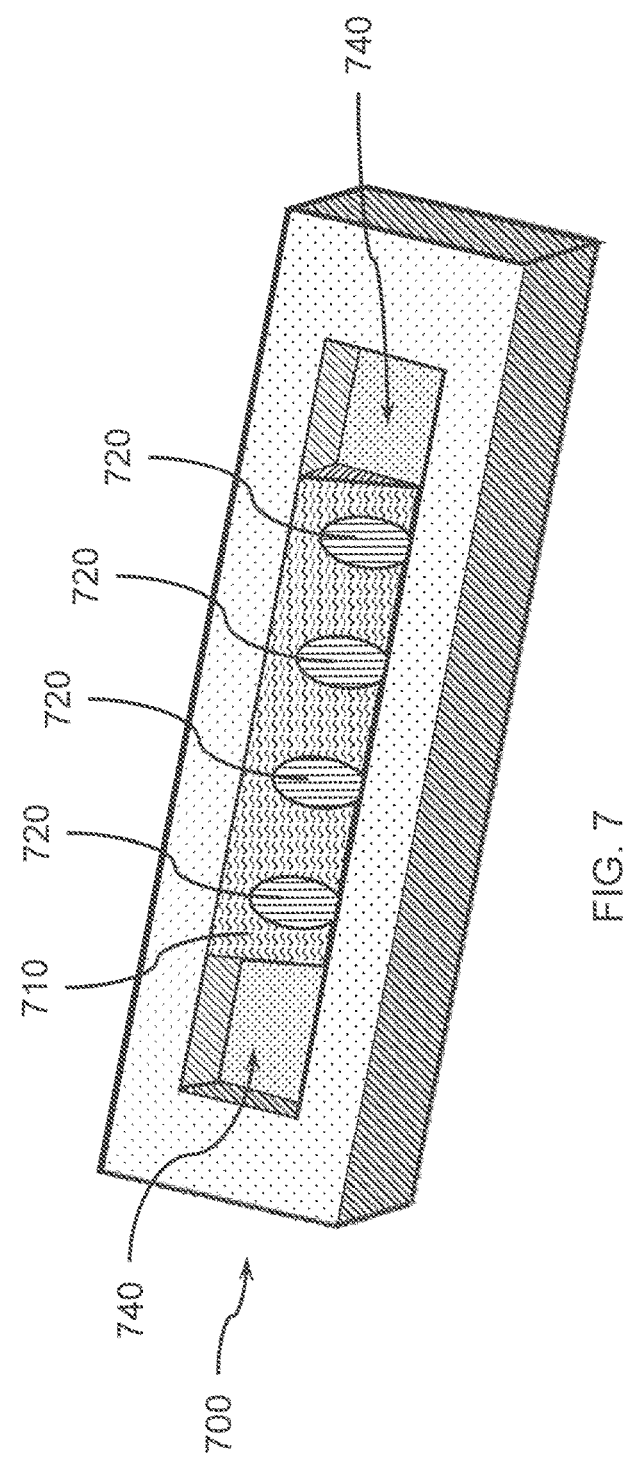
FIG. 7 is an oblique view of a mold for fabricating one or more micro-mirror arrays, in accordance with an embodiment of the present invention.

FIG. 7 is an oblique view of a mold for fabricating one or more micro-mirror arrays, in accordance with an embodiment of the present invention.

In one or more embodiments, a mold 700 may be fabricated using a 3-D printing technique, where the mold can have the complimentary shape of the micro-mirror array 300 to be formed by filling the mold cavity with a suitable material. In the embodiment shown in FIG. 7, four convex depressions 720 are formed on an angled surface 710 of the mold 700 for the formation of four individual ellipsoidal protrusion(s) 320 for the micro-mirrors. The convex depressions 720 can be configured and dimensioned to generate the intended ellipsoidal or paraboloidal shape for the micro-mirror array 300. It should be noted that the mold 700 may be configured and dimensioned to be implemented with any number of complementary concave depressions 720, for the formation of any number of micro-mirrors on the micro-mirror array 300.

In one or more embodiments, recesses 740 can be formed in the mold 700 for the formation of support points on the body of the micro-mirror array 300. Where the recesses 740 can be at opposite ends of the angled surface 710.

In one or more embodiments, transparent material such as, e.g., transparent resin, can fill the cavity of the mold 700. The transparent material may then be cured, and the body 310 with ellipsoidal protrusion(s) 320 and optionally support points removed from the mold cavity.

Figure 8:
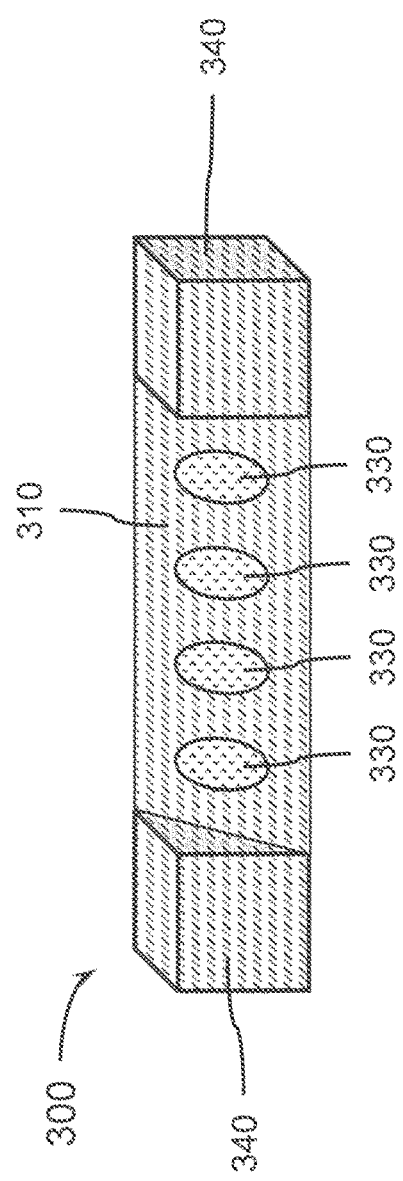
FIG. 8 is an oblique view of a micro-mirror array formed by a mold, in accordance with an embodiment of the present invention.

FIG. 8 is an oblique view of a micro-mirror array formed by a mold, in accordance with an embodiment of the present invention.

In one or more embodiments, the shape of the micro-mirrors can be the complementary shape of conventional, large form, off-axis mirrors, where the intended reflective surface is an internal surface of the micro-mirror array body 310. In various embodiments, the body of the micro-mirror array can be transparent to enable light to pass through it. In conventional, large form, off-axis mirrors, no transparent material is used, since the incident light propagates through air to reflect off an external surface of the mirror.

In various embodiments, cuboid shaped support points 340 can be formed on opposite ends of the triangular prism to hold the micro-mirror array in a correct position in an opening. Other support points can also be formed on the triangular prism.

In various embodiments, the reflective coating 330 can be formed on the ellipsoidal protrusion(s) 320 using an evaporation process or electro-less plating; however, other methods of coating are also contemplated. The elongated surface 312 may be masked, so the metal only deposits on the exposed ellipsoidal protrusion(s) 320, as would be known in the art. In another embodiment, the reflective coating 330 may be etched or stripped from portions of the elongated surface 312, as would be known in the art.

Figure 9:
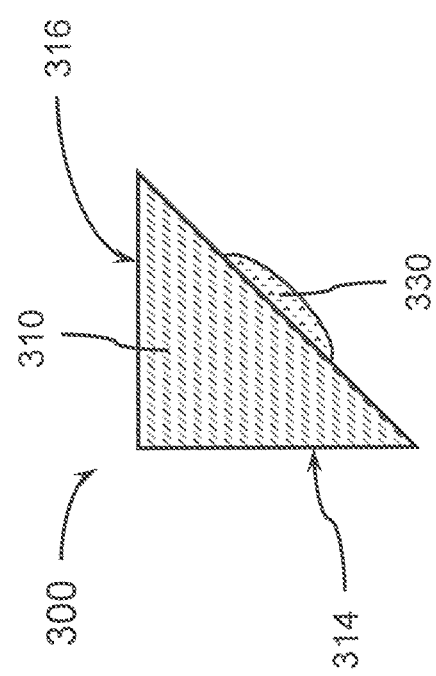
FIG. 9 is a side view of a micro-mirror array configured for bottom insertion into a waveguide array, in accordance with an embodiment of the present invention.

FIG. 9 is a side view of a micro-mirror array configured for bottom insertion into a waveguide array, in accordance with an embodiment of the present invention.

In one or more embodiments, a micro-mirror array 135, 175, 235, 275 can be configured and dimensioned to be inserted in an opening formed in waveguide array 140, 180, 240, 280, where the opening is configured and dimensioned to receive the micro-mirror array. The micro-mirror array 135, 175, 235, 275 can have one or more support points, that fix the micro-mirror array in a proper position when inserted into the opening. In various embodiments, the support points 340 can be cuboid shaped support points that fix the micro-mirror array in a rectangular opening.

In various embodiments, the elongated surfaces 314, 316 of the micro-mirror array 300 can have a width in the range of about 50 un to about 200 um, although other widths are contemplated.

Figure 10:
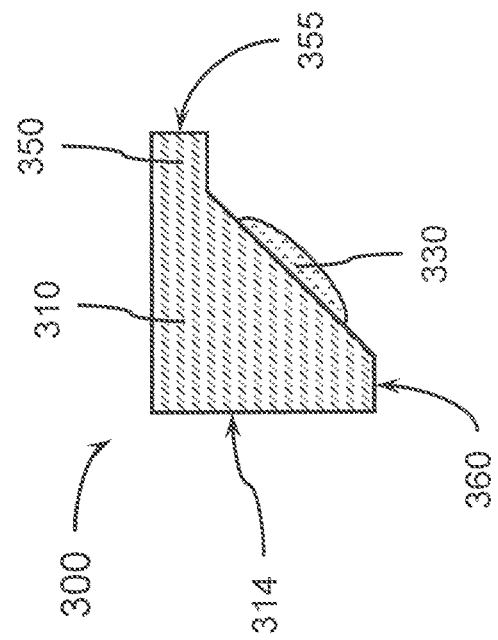
FIG. 10 is a side view of a micro-mirror array configured for top insertion into a waveguide array, in accordance with an embodiment of the present invention.

FIG. 10 is a side view of a micro-mirror array configured for top insertion into a waveguide array, in accordance with an embodiment of the present invention.

In one or more embodiments, the micro-mirror array can have a support point 350 along an edge of the triangular prism body 310, where the support point 350 can be a rectangular flange that extends along a portion of or along the entire length of the micro-mirror array body 310. The rectangular flange support point 350 can have a support surface 355 parallel to an elongated surface (e.g., elongates surface 314), and perpendicular to an elongated surface (e.g., elongates surface 314). The support surface 355 can provide a surface to sit against a sidewall formed by an opening in a cladding layer 142 of the waveguide array 140.

In various embodiments, the micro-mirror array body 310 can have a flat surface 360 along a different edge of the triangular prism (e.g., a beveled surface), where the flat surface 360 is on an opposite side of the ellipsoidal protrusion(s) 320 from the rectangular support point 350. The flat surface 360 can be parallel to an elongated surface 316 to provide a flat surface to sit against a bottom wall formed by an opening in a cladding layer of the waveguide array.

A sequence of steps for assembling a micro-mirror array in a waveguide array by a bottom insertion is shown in FIGS. 11-18. In various embodiments, an opening can be formed in the bottom of a waveguide array 140, 180, 240, 280, where the micro-mirror array 135, 175, 235, 275 can be inserted from the bottom, such that elongated surfaces 314, 316 are facing a waveguide core and a PD array or LD array. At least one of the elongated surfaces can be in contact with the top wall 143 of the opening in the waveguide array after insertion. In various embodiments, the waveguide array 140, 180, 240, 280 can include top and bottom cladding layer(s) and a middle cladding layer with one or more core patterns within the middle cladding layer. The bottom of the waveguide array can be in reference to the location of a LD or PD array at the opposite side of the waveguide array, referred to as the top.

Figure 11:
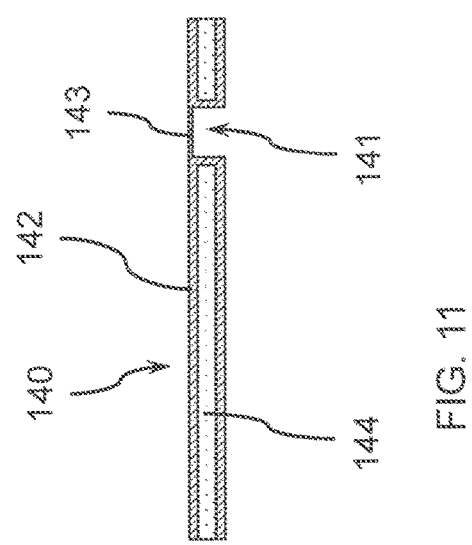
FIG. 11 is a cross-sectional side view showing an opening formed in a waveguide array through a cladding layer and a waveguide core from the bottom, in accordance with an embodiment of the present invention.

FIG. 11 is a cross-sectional side view showing an opening formed in a waveguide array through a cladding layer and a waveguide core layer from the bottom, in accordance with an embodiment of the present invention.

In one or more embodiments, an opening 141 can be formed from a bottom of a waveguide array 140, where the opening can be formed by removing a portion of the cladding layer 142 and a portion of the waveguide core layer 144, where the portion of the cladding layer 142 and the portion of the waveguide core layer 144 can be removed by mechanically cutting the materials (e.g., with a dicing blade, mill, laser, etc.). The opening may be formed only partially into the waveguide array, such that a portion of the cladding layer 142 forms a top wall 143 of the opening 141. The waveguide core layer can include one or more waveguide cores that can be surrounded by and/or embedded in a cladding material. Similar openings can be made in each waveguide array 140, 180, 240, 280. A waveguide core may not extend all the way to a sidewall of the opening 141.

In one or more embodiments, the waveguide core 149 can be a medium that is transparent at a predetermined wavelength to allow unattenuated propagation of a light signal at the predetermined wavelength. The waveguide core 149 can have an index of refraction of a predetermined value based on the material of the waveguide core 149. The cladding layer 142 of the waveguide array 140 can be of a different material than the waveguide core 149, where the cladding layer 142 may have an index of refraction that provides for total internal reflectance of the light signal within the waveguide core 149.

Figure 12:
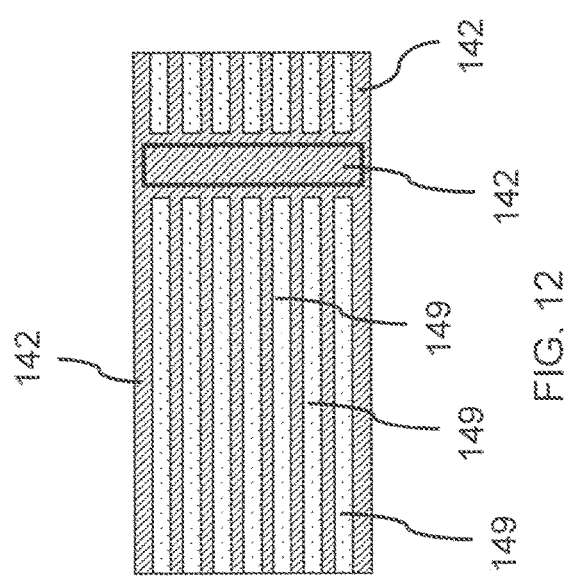
FIG. 12 is a bottom view showing an opening formed in a waveguide array through a cladding layer and a waveguide core from the bottom, in accordance with an embodiment of the present invention.

FIG. 12 is a bottom view showing an opening formed in a waveguide array through a cladding layer and a waveguide core from the bottom, in accordance with an embodiment of the present invention.

In one or more embodiments, the opening 141 can be configured and dimensioned to receive a micro-mirror array 300, where the opening 141 may be rectangular, oval, or other shapes configured and dimensioned to receive the micro-mirror array 300. The opening may expose a portion of the cladding layer 142 forming a top wall 143 of the opening 141, and a portion of the waveguide core layer 144, where there is no pattern of waveguide cores 149. Between the mirror and the end of the waveguide core 149 the light beam may have a size that is larger than the core size for efficient focus. Access to the end face of the waveguide core 149 can be obtained by forming the opening 141. The end face of the waveguide core 149 can be an aperture for receiving light falling within a predetermined angle of incidence, which can form an acceptance cone. The end face of the waveguide core 149 can also be an aperture for emitting light propagating through the waveguide array 140, where the light can be emitted within a predetermined angle. The end face can be a distance from the opening.

Figure 13:
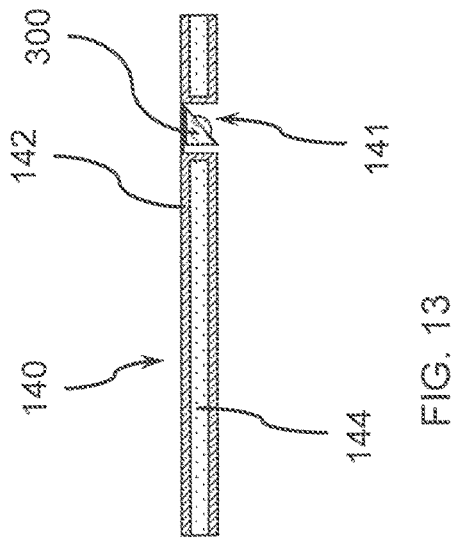
FIG. 13 is a cross-sectional side view showing a micro-mirror array inserted into the opening from the bottom, in accordance with an embodiment of the present invention.

FIG. 13 is a cross-sectional side view showing a micro-mirror array inserted into the opening from the bottom, in accordance with an embodiment of the present invention.

In one or more embodiments, the micro-mirror array 300 can be inserted into the opening 141 from the bottom of the waveguide array 140, where one elongated surface face (e.g., elongated surface 316) is in contact with the top wall 143 of the opening. The micro-mirror array 300 can be inserted into the opening 141, where one elongated surface faces the top wall 143 of the opening, and a second elongated surface faces the end face of the waveguide core 149. The micro-mirror array 300 can be inserted using micro-positioning with a vacuum chuck or similar technology with precise alignment marks, as would be known in the art. The micro-mirror array 300 can be positioned a distance from the end face of the waveguide core(s) 149.

Figure 14:
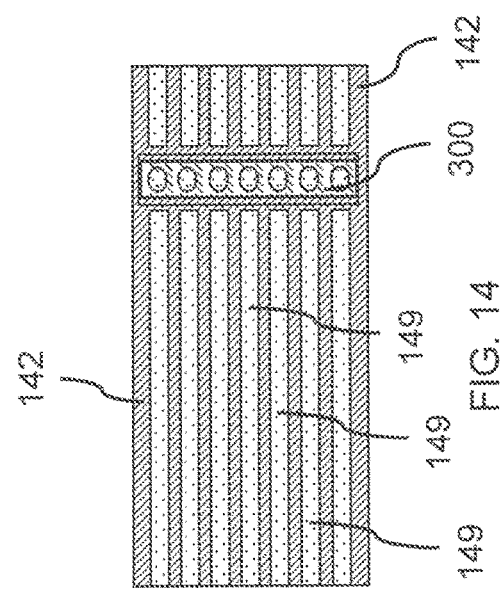
FIG. 14 is a bottom view showing an alignment of the micro-mirrors of the micro-mirror array with the cores after insertion into the opening from the bottom, in accordance with an embodiment of the present invention.

FIG. 14 is a bottom view showing an alignment of the micro-mirrors of the micro-mirror array with the waveguide cores after insertion into the opening from the bottom, in accordance with an embodiment of the present invention.

In various embodiments, the ellipsoidal protrusion(s) 320 forming the micro-mirrors are aligned with each of the one or more cores (i.e., channels) of the waveguide array 140, where the micro-mirrors are positioned in the light path of the waveguide cores 149. The ellipsoidal protrusion(s) 320 forming the micro-mirrors can be separated by intervening spaces, where the distance can coincide with the spacing of the waveguide cores 149 in the waveguide core layer 144. In various embodiments, the micro-mirror array may fill the entire opening 141, or an adhesive filler may fill excess space of the opening, where the adhesive filler may fill the space between the end face of the waveguide core layer 144 and the micro-mirror array 300.

Figure 15:
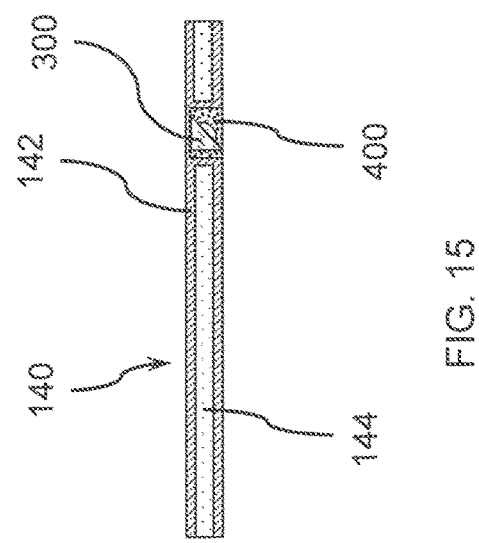
FIG. 15 is a cross-sectional side view of waveguide array showing an adhesive filler in the remaining portion of the opening after inserting the micro-mirror array, in accordance with an embodiment of the present invention.

FIG. 15 is a cross-sectional side view of waveguide array showing an adhesive filler in the remaining portion of the opening after inserting the micro-mirror array, in accordance with an embodiment of the present invention.

In one or more embodiments, an adhesive filler 400 can be injected into the opening 141 to fill the remaining space after inserting the micro-mirror array 300 into opening 141, where the adhesive filler 400 can secure the micro-mirror array 300 in the opening 141. In various embodiments, the adhesive filler 400 can be a transparent epoxy, a resin, a silicone, or other underfill materials known in the art that can be cured to secure the micro-mirror array. The adhesive filler 400 can be in a light path between the waveguide core 149 and the micro-mirror array 300, where the adhesive filler can prevent the formation of an air gap that could generate reflections at an air-micro-mirror interface and/or air-waveguide core layer interface.

Figure 16:
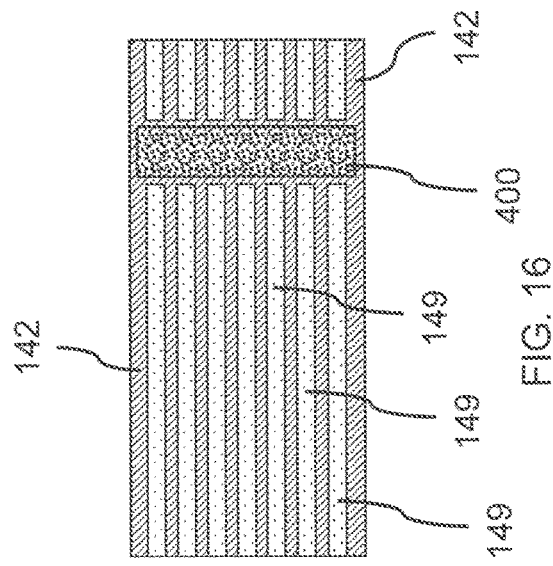
FIG. 16 is a bottom view showing the opening filled with the adhesive filler, in accordance with an embodiment of the present invention.

FIG. 16 is a bottom view showing the opening filled with the adhesive filler, in accordance with an embodiment of the present invention.

In one or more embodiments, the adhesive filler 400 can fill the remaining spacer of the opening 141 after placement and alignment of the micro-mirror array 300.

Figure 17:
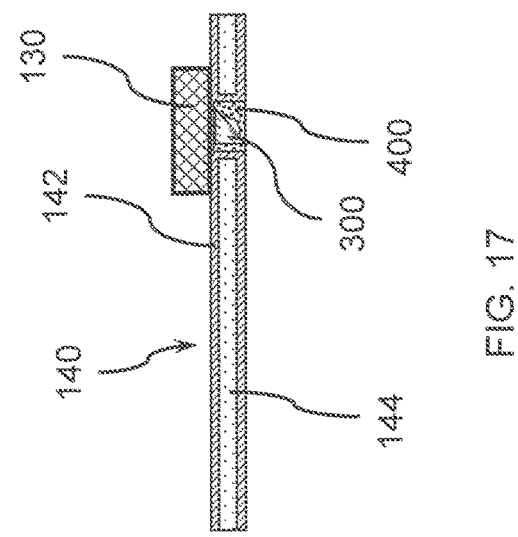
FIG. 17 is a cross-sectional side view of waveguide array showing a laser diode array affixed to the top surface of the waveguide array across from the micro-mirror array, in accordance with an embodiment of the present invention.

FIG. 17 is a cross-sectional side view of a waveguide array showing a laser diode array affixed to the top surface of the waveguide array across from the micro-mirror array, in accordance with an embodiment of the present invention.

In one or more embodiments, a laser diode array 130 can be affixed to the waveguide array 140, where the laser diode array 130 can be affixed to the waveguide array by flip-chip bonding. The laser diode array 130 can be affixed to the top surface of the waveguide array 140, where the laser diode array 130 can be positioned and bonded in alignment with the micro-mirror array 300, such that a light beam from a laser diode passes through the cladding layer 142 forming a top wall 143 of the opening, and reflects off a micro-mirror into a properly aligned waveguide core 149.

Since the ellipsoidal protrusion(s) 320 have two focal points (i.e., an object point and an image point), which lie on the major (longest) axis of the ellipsoid and are spaced equally along the major axis from the center, the ellipsoidal mirrors can be configured, dimensioned, and aligned to have an incoming light beam from an exit aperture of a laser diode at one focal point, and the other focal point within the waveguide core 149, such that at least the majority of the light beam passes through the waveguide aperture into waveguide core 149. The light beam can pass through the interface between the cladding layer 142 and an elongated surface (e.g., elongated surface 316) of the waveguide body 310 to the reflective surface on the ellipsoidal protrusion 320, where the indexes of refraction may be matched to reduce or eliminate reflection and refraction at the micro-mirror array-top wall interface.

Figure 18:
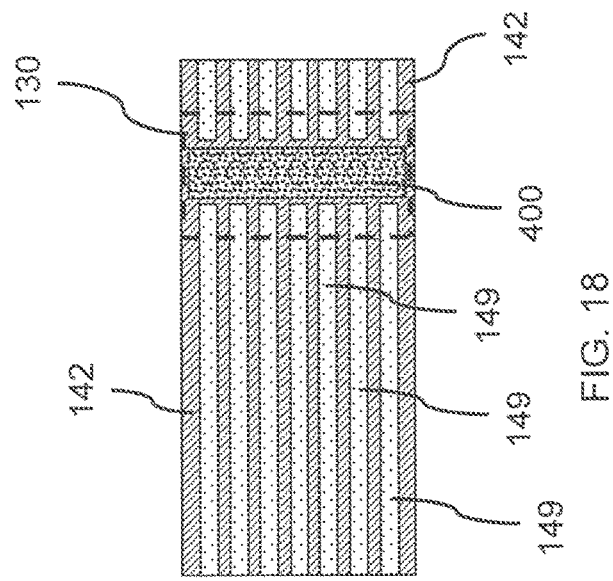
FIG. 18 is a bottom view showing the positioning of the laser diode array in alignment with the opening and micro-mirror array, in accordance with an embodiment of the present invention.

FIG. 18 is a bottom view showing the positioning of the laser diode array in alignment with the opening and micro-mirror array, in accordance with an embodiment of the present invention.

In various embodiments, the laser diode array 130 can be positioned above the opening 141, as shown by dashed lines.

A sequence of steps for assembling a micro-mirror array in a waveguide array by a top insertion is shown in FIGS. 19-26. In various embodiments, an opening can be formed in the top of a waveguide array 140, 180, 240, 280, where the micro-mirror array 135, 175, 235, 275 can be inserted from the top, such that elongated surfaces 314, 316 are facing a waveguide core 149 and a PD array or LD array. At least one of the elongated surfaces can be exposed at the opening in the waveguide array after insertion, and a flat surface (e.g., flat surface 360 along an edge of the triangular prism) can be in contact with the bottom wall 147 of the opening 141 in the waveguide array 140 after insertion.

Figure 19:
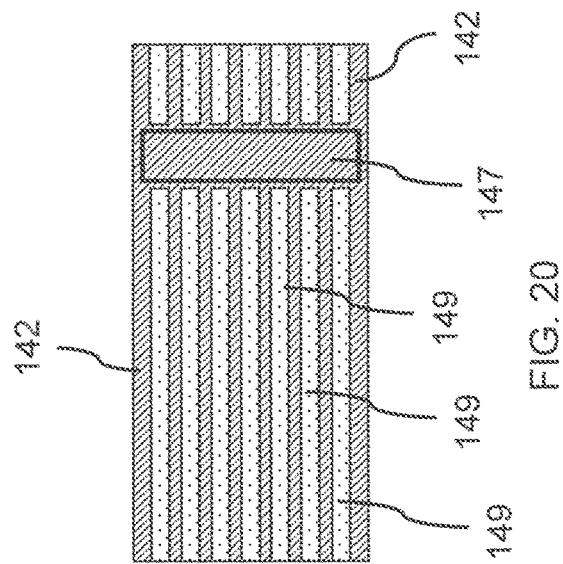
FIG. 19 is a cross-sectional side view showing an opening formed in a waveguide array through a cladding layer and a waveguide core from the top, in accordance with an embodiment of the present invention.

FIG. 19 is a cross-sectional side view showing an opening formed in a waveguide array through a cladding layer and a waveguide core from the top, in accordance with an embodiment of the present invention.

In one or more embodiments, an opening 141 can be formed from a top of a waveguide array 140, where the opening can be formed by removing a portion of the cladding layer 142 and a portion of the waveguide core layer 144, where the portion of the cladding layer 142 and the portion of the waveguide core layer 144 can be removed by mechanically cutting the materials (e.g., with a dicing blade, mill, laser, etc.). The opening 141 may be formed only partially into the waveguide array, such that a portion of the cladding layer 142 forms a bottom wall 147 of the opening 141. Similar openings can be made in each waveguide array 140, 180, 240, 280.

Figure 20:
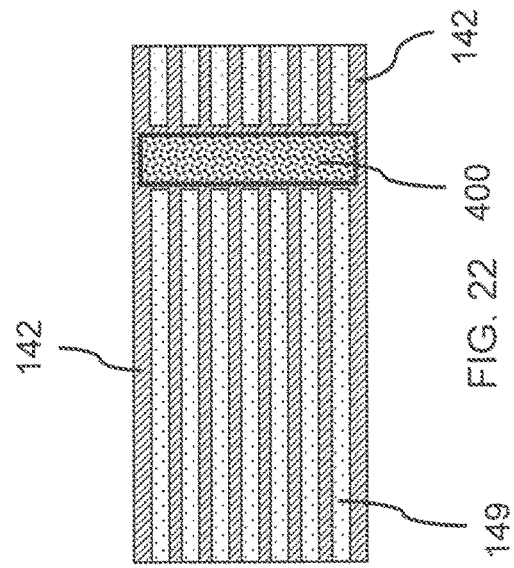
FIG. 20 is a top view showing an opening formed in a waveguide array through a cladding layer and a waveguide core from the top, in accordance with an embodiment of the present invention.

FIG. 20 is a top view showing an opening formed in a waveguide array through a cladding layer and a waveguide core from the top, in accordance with an embodiment of the present invention.

In one or more embodiments, the opening 141 can be configured and dimensioned to receive the micro-mirror array, where the opening 141 may be rectangular. The opening may expose a portion of the cladding layer 142 forming a bottom wall 147 of the opening 141, and a portion of the waveguide core layer 144, where there is no waveguide core pattern. Access to an end face of the waveguide core 149 can be obtained by forming the opening 141. The end of the waveguide core 149 can be an aperture for receiving light falling within a predetermined angle of incidence, which can form an acceptance cone. The end of the waveguide core 149 can be an aperture for emitting light propagating through the waveguide array 140, where the light can also be emitted in a predetermined angle. Between the micro-mirror and the end of the waveguide core the light beam may have a size that is larger than the core size for efficient focus. A portion of the waveguide core layer 144 can be between the micro-mirror array 140 and the end faces of the waveguide cores 149. A gap can be between an elongated surface of the micro-mirror array 140 and the sidewall of the opening 141.

Figure 21:
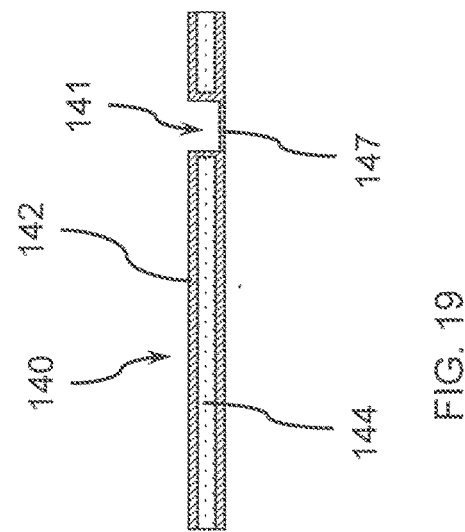
FIG. 21 is a cross-sectional side view showing an adhesive filler in a portion of the space formed by the opening, in accordance with an embodiment of the present invention.

FIG. 21 is a cross-sectional side view showing an adhesive filler in a portion of the space formed by the opening, in accordance with an embodiment of the present invention.

In one or more embodiments, an adhesive filler 400 can be placed in the opening 141, such that at least a portion of the space formed by the opening 141 contains the adhesive filler 400. In various embodiments, a sufficient amount of adhesive filler can be placed in the space to fill up a gap between an angled surface of the micro-mirror array body 310 and the bottom surface 147 of the opening 141. The adhesive filler 400 can be in the gap on the exterior side of the reflective coating.

Figure 22:
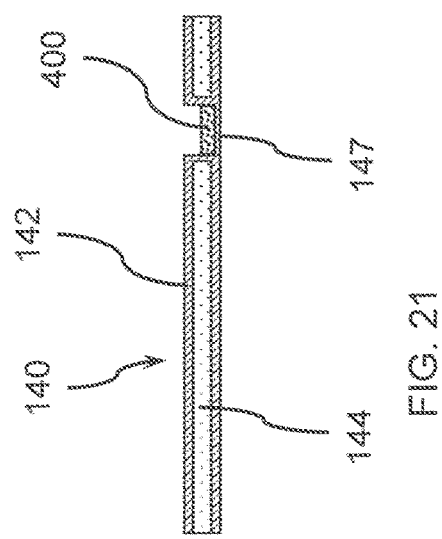
FIG. 22 is a top view showing the adhesive filler in the bottom of the opening formed in a waveguide array for affixing a micro-mirror array in the opening, in accordance with an embodiment of the present invention.

FIG. 22 is a top view showing the adhesive filler in the bottom of the opening formed in a waveguide array for affixing a micro-mirror array in the opening, in accordance with an embodiment of the present invention.

In one or more embodiments, the adhesive filler can be injected into the space formed by the opening 141 to at least cover the bottom surface 147.

FIG. 23 is a cross-sectional side view showing a micro-mirror array inserted into the opening from the top, in accordance with an embodiment of the present invention.

In one or more embodiments, the micro-mirror array 300 can be inserted into the opening 141 from the top of the waveguide array 140, where one elongated surface face (e.g., elongated surface 316) is exposed in the opening 141, and a flat surface (e.g., flat surface 360) can be in contact with the bottom wall 147 of the opening. The micro-mirror array 300 can be inserted into the opening 141, where one support surface 355 faces and is in contact with a sidewall wall 148 of the opening, and a second elongated surface faces the end of the waveguide core 149. The micro-mirror array 300 can displace the adhesive filler 400, so it fills the gap formed between the angle face of the micro-mirror array and bottom wall of the opening. The micro-mirror array 300 can be inserted using micro-positioning with a vacuum chuck or similar technology with precise alignment marks, as would be known in the art.

FIG. 24 is a top view showing the flat elongated surface of the micro-mirror array in the opening formed in a waveguide array, in accordance with an embodiment of the present invention.

In one or more embodiments, the micro-mirror array 300 can be configured and dimensioned to fit within the opening 141 formed in the waveguide array 140, where the micro-mirror array 300 may slip into the opening without binding against the walls of the opening. The adhesive filler 400 can fill the gap around the micro-mirror array 140.

FIG. 25 is a cross-sectional side view of waveguide array showing a laser diode array affixed to the top surface of the waveguide array on the micro-mirror array, in accordance with an embodiment of the present invention.

In one or more embodiments, a laser diode array 130 can be affixed to the waveguide array 140, where the laser diode array 130 can be affixed to the waveguide array by flip-chip bonding. The laser diode array 130 can be affixed to the top surface of the waveguide array 140, where the laser diode array 130 can be positioned and bonded in alignment with the micro-mirror array 300, such that a light beam from a laser diode (e.g., VCSEL) passes through the exposed elongated surface of the micro-mirror array 300, and reflects off a micro-mirror into a properly aligned waveguide core 149.

FIG. 26 is a top view showing the positioning of the laser diode array over the exposed surface of the micro-mirror array, in accordance with an embodiment of the present invention.

In various embodiments, the laser diode array 130 can be positioned above the opening 141, where the laser diode array 130 can be in alignment with the opening and micro-mirror array 300. A micro-lens can be between the laser diode and micro-mirror.

In one or more embodiments, a second opening may be made in the waveguide array 140 to provide for insertion of a second micro-mirror array 300 to couple a light signal to a waveguide connector 145 affixed to the top surface of the waveguide array.

While FIGS. 11-26 were described in reference to a waveguide array 140, this is not intended to be a limitation, and any other waveguide arrays 180, 240, 280 can be similarly configured and fabricated. A PD array can be substituted for the laser diode array, and paraboloidal micro-mirrors can be substituted for ellipsoidal micro-mirrors.

FIG. 27 is a side view of a laser diode array aligned with a micro-mirror array, such that a light beam from a laser diode is focused through an aperture into a waveguide core, in accordance with an embodiment of the present invention.

In one or more embodiments, a laser diode (e.g., VCSEL) of a laser diode array 130 can be positioned such the laser diode aperture 132 is at a first focal point 510 of an ellipsoidal micro-mirror and the second focal point 520 of an ellipsoidal micro-mirror is within a waveguide core 149, where at least the majority of the light enters the waveguide core at the core aperture (i.e., end face). The arrow indicates the direction of light travel. The micro-mirror(s) of the micro-mirror array 140 can have a very sharp focus (i.e., short focal length on the order of microns) and short distance from the waveguide core to the focal point. The micro-mirrors can have lower dispersion and aberrations than lenses.

In various embodiments, the ellipsoidal micro-mirror can focus the light beam from the laser diode 130 to a spot having a diameter in the range of about 10 microns (um) to about 50 microns, or in the range of about 15 um to about 30 um, or about 20 um, where the diameter of the pot size can be smaller than the diameter of the waveguide core 149. Other spot sizes are also contemplated within the scope of the invention. The diameter of the aperture of the laser diode can be in the range of about 2.5 um to about 7.5 um or about 5 um. By focusing the light beam to a spot size less than the diameter of the core aperture, the signal loss entering the waveguide core 149 can be reduced to less than 1 dB. In various embodiments, the micro-mirror arrays 130 using ellipsoidal or paraboloidal mirror(s) can match the output from a VCSEL to the acceptance angle and spatial profile of a waveguide core 149 for the reflecting light.

In various embodiments, the angular distribution (e.g., as a solid angle) of the light rays can be independent of the position of the emitting area. As a light beam expands in free space before reaching the reflective surface, light rays at the edge of the beam have an angular distribution tilted towards the direction of divergence, while light rays at the center of the beam have an angular distribution close to the axis of the beam. The total beam can then be better approximated as an ideal point source emitter, and can be efficiently focused by the ellipsoidal mirror. The position of the waveguide core end face can be far enough from the micro-mirror so the total light beam diameter is smaller than the core size at the entry surface. In various embodiments, the distance between the end of the waveguide core 149 and the reflecting surface of the micro-mirror can be in the range of about 5 times to about 10 times the core size.

In a non-limiting exemplary embodiment, the core diameter of a single mode optical fiber can be in the range of about 8 microns (um) to about 10.5 microns, and the distance between the end face of the single mode core and the reflecting surface of the mirror can be in the range of about 40 um to 105 um, or in the range of about 40 um to about 85 um, or in the range of about 40 um to about 52 um, or in the range of about 80 um to about 105 um.

Figure 28:
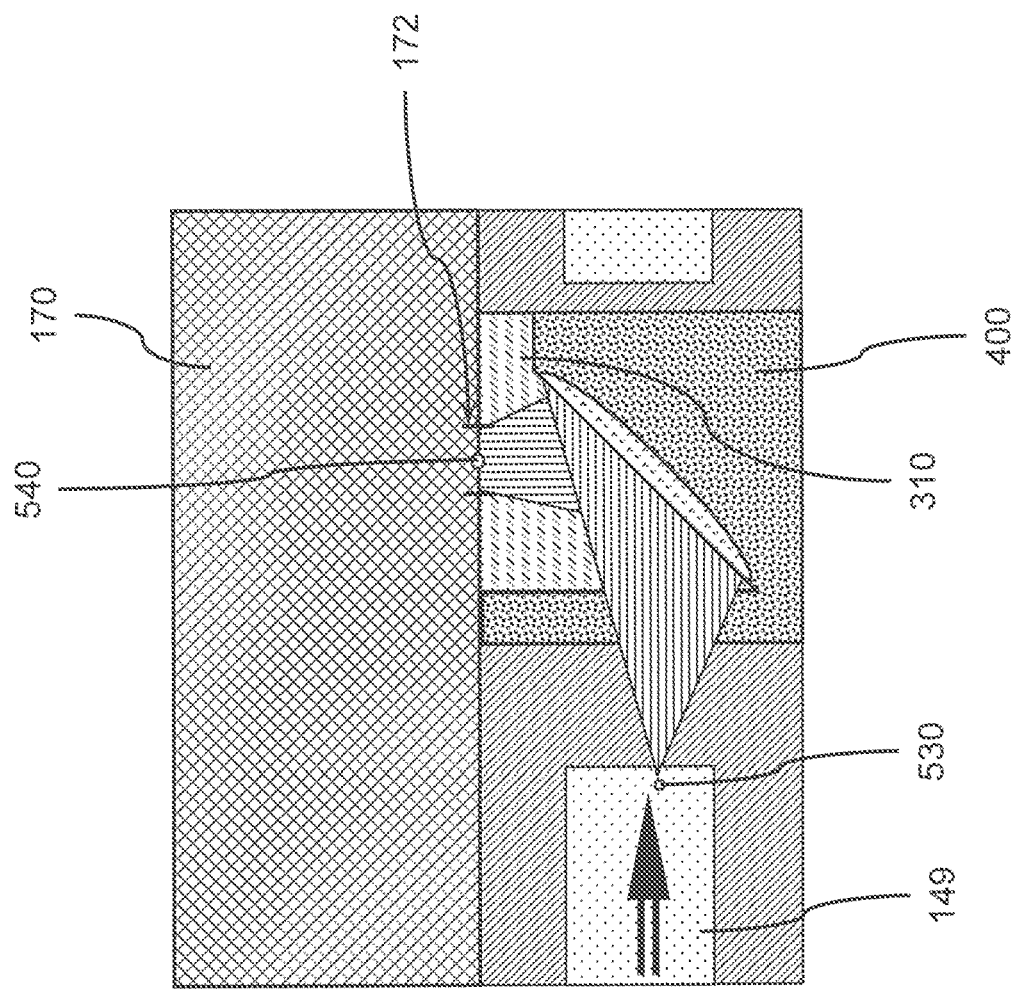
FIG. 28 is a side view of a photodiode array aligned with a micro-mirror array, such that a light beam from a waveguide core is focused through an aperture into the photodiode array, in accordance with an embodiment of the present invention.

FIG. 28 is a side view of a photodiode array aligned with a micro-mirror array, such that a light beam from a waveguide core is focused through an aperture into the photodiode array, in accordance with an embodiment of the present invention.

In one or more embodiments, a photodiode of a photodiode array 170 can be positioned such the photodiode aperture 172 is at a second focal point 540 of an ellipsoidal micro-mirror and the first focal point 530 of the ellipsoidal micro-mirror is within a waveguide core 149, where at least the majority of the light exiting the waveguide core 149 at the core aperture is reflect into the photodiode aperture 172.

In various embodiments, the ellipsoidal micro-mirror can focus the light beam from the waveguide core 149 to a spot having a diameter in the range of about 10 microns (um) to about 30 microns, or in the range of about 15 um to about 25 um, or about 20 um, where the diameter of the pot size can be smaller than the aperture of the photodetector. Other spot sizes are also contemplated within the scope of the invention. By focusing the light beam to a spot size less than the diameter of the photodetector aperture, the signal loss at the photodetector can be reduced to less than 1 dB. The micro-mirror arrays 130 using ellipsoidal or paraboloidal mirror(s) can focus the output beam of a waveguide core 149 onto a very small spot size on a photodiode at a small distance from the waveguide core 149.

In various embodiments, the angular distribution of the light rays is independent of the position within the emitting area at the output surface of the waveguide. After the light beam leaves the core and expands in a core-free region before reaching a reflecting surface, light rays at the edge of the beam have an angular distribution titled towards the direction of divergence, while light rays at the center of the beam have an angular distribution close to the beam axis. The total beam can then be better approximated by an ideal point source emitter, and can be efficiently focused by the mirror to a small spot size (i.e., less than the core diameter or photodiode aperture). The position of the photodiode can be far enough from the micro-mirror so that the total light beam diameter is smaller than the aperture size. The distance between the end face of the waveguide core 149 and the reflecting surface of the micro-mirror can be in the range of about 5 times to about 10 times the core diameter.

Figure 29:
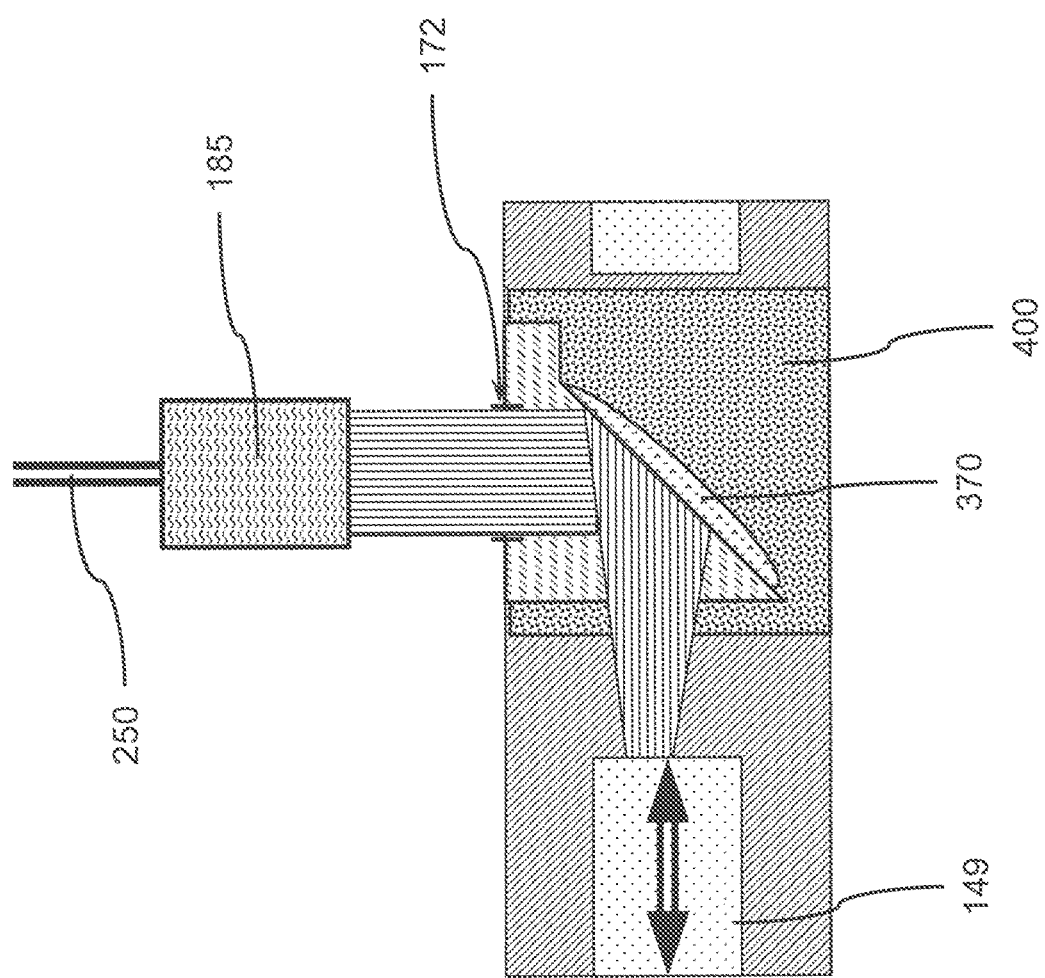
FIG. 29 is a side view of an fiber optic connector aligned with a micro-mirror array, such that a light beam reflected from the micro-mirror is parallel and directed to the connector, inside which a lens focuses the light on to a fiber core, in accordance with an embodiment of the present invention.

FIG. 29 is a side view of an fiber optic connector aligned with a micro-mirror array, such that a light beam reflected from the micro-mirror is parallel and directed to the connector, inside which a lens focuses the light on to a fiber core, in accordance with an embodiment of the present invention.

In one or more embodiments, the micro-mirror can be a paraboloidal mirror 370, such that the reflected light directed to a photodetector or optical fiber core is a parallel beam of light. The paraboloidal mirror 370 can make the output beam of a waveguide core 149 parallel for coupling to a fiber-lens connector assembly, and/or focus the parallel output beam from a fiber-lens connector onto a waveguide core 149, with acceptance angle and spatial profile matching. The double-headed arrow indicates that light may travel in either direction.

In one or more embodiments, the micro-mirror can be a paraboloidal mirror 370, such that the reflected light directed to the lens inside a fiber optic connector is a parallel beam of light, or the light beam from the connector is focused on the core.

In various embodiments, the lenses of a fiber optic connector can be aligned with a paraboloidal micro-mirror array, such that a diverging light beam reflected from a micro-mirror is parallel and directed to the aperture into the lens of the fiber optic connector, or a parallel light beam from the lenses of a fiber optic connector is focused on the waveguide core end face.

In various embodiments, a paraboloidal or ellipsoidal micro-mirror is separated from the end face of the waveguide core 149 by a distance, such that a light beam can expand to be larger than the diameter or side dimension of the core by the time the light beam reached the micro-mirror. The distance between the end face of the waveguide core 149 and the reflective coating 330 on a ellipsoidal or paraboloidal protrusion(s) 320 can be in the range of about 5 time to about 10 times the diameter or side dimension of the waveguide core 149. The adhesive filler 400 can fill the space between a sidewall of the opening in the waveguide and the elongated surface of the micro-mirror array 300 to avoid forming an air gap between the waveguide and micro-mirror array that could cause reflections at the surface.

In operation, a laser diode 130 can project a light beam through the transparent material of the micro-mirror array body 310 of a first micro-mirror array 135. The beam reflects off of the reflective coating 330 on the one or more micro-mirrors of the first micro-mirror array 135 onto the waveguide core 149. The light beam is conveyed through the first waveguide array 140, a first fiber optic array 150, and a fourth waveguide array 280, and projected onto a fourth micro-mirror array 275. The light beam passes through the transparent material of the body 310 of the fourth micro-mirror array 275 and reflects off of the reflective coating 330 of the mirror of the fourth micro-mirror array 275 into the aperture of a photodiode detector array 270.

By passing through the transparent material of the body 310 of the micro-mirror arrays 135, 175, 235, 275, there is no air gap present at the reflecting surface of the optical path of the beam.

In various embodiments, the fabrication and insertion of micro-mirror arrays in polymer waveguides could potentially lead to optical links with a much lower loss, from 4-9 dB currently to less than 1 dB for a chip-to-chip link. With such low losses, a much enhanced flexibility in optical CPU link design will be reached, and multiplexing solutions can be much easier to implement to obtain a higher channel density. The micro-mirror can avoid the signal losses due to total internal reflectance at the surface of a micro-lens. Optical interconnects with low signal loss can achieve up to 10 times greater bandwidth.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of a component, a system, and a fabrication method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of forming a multi-chip module, comprising:
    filling a mold with a transparent material to form a micro-mirror array including an elongated transparent body having a prism shape with three elongated surfaces and two ends, and one or more ellipsoidal or paraboloidal protrusion(s) formed on one of the three elongated surfaces, a first cuboid shaped block on a first end of the triangular prism, and a second cuboid shaped block on a second end of the triangular prism opposite the first end;
    forming a reflective coating on at least one of the one or more ellipsoidal or paraboloidal protrusion(s); and
    inserting the micro-mirror array into an opening in a waveguide array including one or more waveguide cores in a cladding layer, such that one of the elongated surfaces without the ellipsoidal or paraboloidal protrusion(s) faces one or more waveguide core ends, and the other elongated surface without the ellipsoidal or paraboloidal protrusion(s) faces an opto-electronic chip array or a fiber optic connector, wherein the micro-mirror array is positioned in the opening a distance from the one or more waveguide core ends.

2. The method as recited in claim 1, wherein the one or more ellipsoidal or paraboloidal protrusion(s) having the reflective coating thereon forms one or more off-axis ellipsoidal or paraboloidal mirror(s).

3. The method as recited in claim 2, further comprising connecting a fiber optic connector to the waveguide array, where the fiber optic connector is facing the one or more off-axis ellipsoidal or paraboloidal mirror(s).

4. The method as recited in claim 3, further comprising securing the micro-mirror array in the waveguide array with an adhesive filler, the adhesive being placed along a slanted portion and in a light path between the waveguide core and the micro-mirror array.

5. The method as recited in claim 4, wherein the ellipsoidal or paraboloidal protrusion(s) faces an opto-electronic chip array, and wherein the opto-electronic chip array is a laser diode (LD) array.

6. The method as recited in claim 4, wherein a light beam from the first laser diode array is reflected with an angle of approximately 90° and focused to enter a waveguide core in a waveguide core layer of the waveguide array.

7. The method as recited in claim 4, wherein the first laser diode array has 12 or 24 channels.

8. A method of forming a first multi-chip module, comprising:
    filling a mold with a transparent material to form a micro-mirror array including an elongated transparent body having a prism shape with three elongated surfaces and two ends, and one or more ellipsoidal or paraboloidal protrusion(s) formed on one of the three elongated surfaces, a first cuboid shaped block on a first end of the triangular prism, and a second cuboid shaped block on a second end of the triangular prism opposite the first end;
    forming a reflective coating on at least one of the one or more ellipsoidal or paraboloidal protrusion(s);
    inserting the micro-mirror array into an opening in a first waveguide array including one or more waveguide cores in a cladding layer, such that one of the elongated surfaces without the ellipsoidal or paraboloidal protrusion(s) faces one or more waveguide core ends, wherein the micro-mirror array is positioned in the opening a distance from the one or more waveguide core ends; and connecting a first fiber optic connector to the first waveguide array, where the first fiber optic connector is facing the one or more off-axis ellipsoidal or paraboloidal mirror(s) of the micro-mirror array.

9. The method as recited in claim 8, further comprising securing the micro-mirror array in the waveguide array with an adhesive filler, the adhesive being placed along a slanted portion and in a light path between the waveguide core and the micro-mirror array.

10. The method as recited in claim 8, wherein the first fiber optic connector is optically coupled to a second waveguide array by an optical fiber array and a second fiber optic connector.

11. The method as recited in claim 10, wherein the second waveguide array is a component of a second multi-chip module configured to receive a plurality of optical signals from the first multi-chip module.

12. A method of forming a micro-mirror array for a multi-chip module, comprising:

forming an elongated transparent body having a prism shape with three elongated surfaces and two ends, and one or more ellipsoidal or paraboloidal protrusion(s) formed on one of the three elongated surfaces, a first cuboid shaped block on a first end of the triangular prism, and a second cuboid shaped block on a second end of the triangular prism opposite the first end; and forming a reflective coating on at least one of the one or more ellipsoidal or paraboloidal protrusion(s) to produce the micro-mirror array.

13. The method of claim 12, wherein the prism shape is a right triangle with the one or more ellipsoidal or paraboloidal protrusion(s) on the one of the three elongated surfaces forming the hypotenuse of the right triangle.

14. The method of claim 12, wherein the three elongated surfaces of the prism shape each have a length in a range of about 50 um to about 250 um.

15. The method of claim 12, wherein the one or more ellipsoidal or paraboloidal protrusion(s) have a tolerance of about 1 um variation in the overall size.

16. The method of claim 12, wherein the elongated transparent body is formed by a 3D printing technique.

17. The method of claim 12, wherein the elongated transparent body is formed by filling a mold with a transparent material.

18. The method of claim 17, wherein the transparent material is a transparent resin that is cured in the mold.

19. The method of claim 18, wherein the reflective coating is formed by electroless plating.

20. The method of claim 18, further comprising inserting the micro-mirror array into an opening in a first waveguide array including one or more waveguide cores in a cladding layer, such that one of the elongated surfaces without the ellipsoidal or paraboloidal protrusion(s) faces one or more waveguide core ends, wherein the micro-mirror array is positioned in the opening a distance from the one or more waveguide core ends.

* * * * *